US011110994B2

(12) United States Patent
Hedlund et al.

(10) Patent No.: US 11,110,994 B2
(45) Date of Patent: Sep. 7, 2021

(54) SNOWMOBILE

(71) Applicant: Polaris Industries Inc., Medina, MN (US)

(72) Inventors: Michael A. Hedlund, Roseau, MN (US); Corey D. Omdahl, Roseau, MN (US); Jeffrey A. Eaton, Roseau, MN (US); Ronald W. Bachleitner, Roseau, MN (US); Joel R. Schildgen, Chisago City, MN (US)

(73) Assignee: Polaris Industries Inc., Medina, MN (US)

( * ) Notice: Subject to any disclaimer, the term of this patent is extended or adjusted under 35 U.S.C. 154(b) by 554 days.

(21) Appl. No.: 15/899,406

(22) Filed: Feb. 20, 2018

(65) Prior Publication Data
US 2018/0237106 A1  Aug. 23, 2018

Related U.S. Application Data

(60) Provisional application No. 62/461,083, filed on Feb. 20, 2017.

(51) Int. Cl.
*B62M 27/02* (2006.01)

(52) U.S. Cl.
CPC ....... *B62M 27/02* (2013.01); *B62M 2027/027* (2013.01); *B62M 2027/028* (2013.01)

(58) Field of Classification Search
CPC ............ B62M 27/02; B62M 2027/027; B62M 2027/28
See application file for complete search history.

(56) References Cited

U.S. PATENT DOCUMENTS

| 3,721,454 | A | * | 3/1973 | Anderson | B60D 1/00 |
| | | | | | 280/24 |
| 5,853,187 | A | * | 12/1998 | Maier | B60D 1/485 |
| | | | | | 280/495 |
| 7,032,906 | B1 | * | 4/2006 | Wright | B60D 1/00 |
| | | | | | 280/18 |
| 7,353,898 | B1 | | 4/2008 | Bates, Jr. | |
| 7,533,749 | B1 | * | 5/2009 | Sampson | B62M 27/02 |
| | | | | | 180/182 |

(Continued)

FOREIGN PATENT DOCUMENTS

CA        2995691        8/2018

OTHER PUBLICATIONS

Office Action issued by the Canadian Intellectual Property Office, dated Apr. 9, 2019, for Canadian Patent Application No. 2,995,691; 3 pages.

*Primary Examiner* — Kevin Hurley
*Assistant Examiner* — Marlon A Arce
(74) *Attorney, Agent, or Firm* — Faegre Drinker Biddle & Reath LLP

(57) ABSTRACT

A snowmobile comprises a chassis with a front portion and a tunnel, and a power train unit supported by the chassis. The snowmobile further includes a plurality of ground-engaging members cooperating with the power train unit to operate the snowmobile. The plurality of ground-engaging members includes a pair of front skis and an endless track assembly. The track includes a wide track belt and the snowmobile body portions and chassis are adapted to fit the wide track belt. A rear rack assembly is positioned on a rear of the snowmobile frame and can support a passenger seat.

15 Claims, 40 Drawing Sheets

(56) References Cited

U.S. PATENT DOCUMENTS

| | | |
|---|---|---|
| 7,694,768 B2 | 4/2010 | Giese |
| 7,854,285 B1 | 12/2010 | Giese |
| 7,891,454 B2 | 2/2011 | Giese |
| 8,127,877 B2 | 3/2012 | Fredrickson |
| 8,225,896 B2 * | 7/2012 | Eichenberger ........ B60R 25/302 180/190 |
| 8,490,731 B2 | 7/2013 | Eaton |
| 8,590,654 B2 | 11/2013 | Kerner |
| 8,678,464 B2 | 3/2014 | Smith |
| 8,944,204 B2 | 2/2015 | Ripley |
| 9,096,289 B2 | 8/2015 | Hedlund |
| 9,428,232 B2 | 8/2016 | Ripley |
| 9,446,810 B2 | 9/2016 | Ripley |
| 2006/0108164 A1 * | 5/2006 | Wubbolts ............... B62K 5/027 180/190 |
| 2015/0197313 A1 | 7/2015 | Vistad |
| 2019/0047662 A1 * | 2/2019 | Lemieux ................ B62M 27/02 |

* cited by examiner

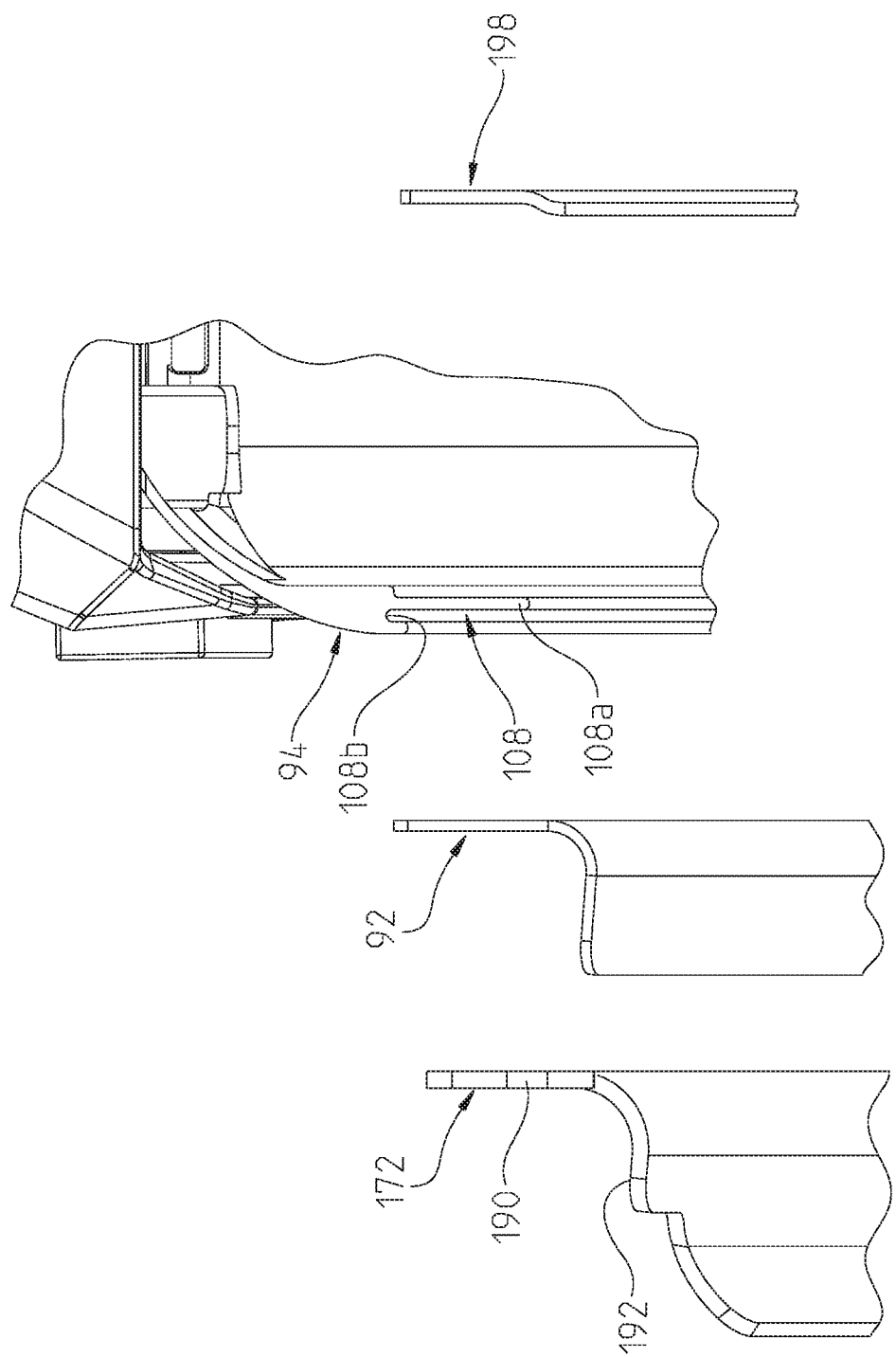

US 11,110,994 B2

SNOWMOBILE

RELATED APPLICATIONS

The present application claims priority to U.S. Provisional Patent Application Ser. No. 62/461,083, filed Feb. 20, 2017; the subject matter of which is incorporated herein by reference.

BACKGROUND OF THE DISCLOSURE

The present disclosure relates to snowmobiles and, more particularly, to wide track snowmobiles.

Generally, snowmobiles are available for various applications such as deep snow, high performance, luxury touring, and trail riding, for example. Another application for snowmobiles is the wide track version which has a 20" track versus the standard 15" track. Regardless of the application, certain structural components are common to many snowmobiles. For example, snowmobiles typically include a frame, a track assembly, a power train, skis, and at least one suspension system, as are illustrated in any of the following U.S. Pat. Nos. 7,353,898; 7,533,749; 7,694,768; 7,891,454; 7,854,285; 8,127,877; 8,490,731; 8,590,654; 8,944,204; 9,096,289; 9,428,232; and 9,446,810; the complete disclosures of which are expressly incorporated herein by reference.

One common area for snowmobiles generally relates to the overall architecture, where a frame includes a tunnel and a front chassis portion which retains the power train, and a front suspension that mounts skis to the frame. A drive shaft is typically mounted to the front chassis portion and includes drive sprockets for powering the belt. A chain case is also typically provided to transfer power from an engine or CVT to the drive shaft. Reference is made to U.S. Pat. No. 7,694,768 which shows a typical snowmobile drivetrain, the subject matter of which is incorporated herein by reference.

In the case of wide track snowmobiles, one common characteristic is to provide a wider tunnel to the track as the width footprint of the track is increased to 20". A wider tunnel is provided to cover the wider belt. A front body typically surrounds at least the front frame portion to enclose the engine and other mechanical components.

SUMMARY OF THE DISCLOSURE

In one embodiment of the disclosure a snowmobile comprises a chassis having a front bulkhead and a tunnel, the front bulkhead including first and second cast clips which couple about a longitudinal mating axis; wherein the cast clips are asymmetric with the second cast clip being wider than the first cast clip.

In another embodiment of the disclosure, a vehicle comprises a frame; ground engaging members supporting the frame; a driver's seat supported by the seat; and a rear rack assembly coupled to a rear portion of the frame and positioned rearwardly of the driver's seat. The rear rack assembly comprises a platform coupled to the frame; a rack generally surrounding at least a portion of the platform and coupled to the frame; and a rear seat support coupled to the rack and positioned at a forward portion of the rack and rearward of the driver's seat.

In another embodiment of the disclosure, a snowmobile comprises a frame comprising a bulkhead and a tunnel; the tunnel comprising a center portion, side portions and a transition portion, the transition portion spacing the side portions away from the center portion, wherein the transition portion is arcuately formed to form an outer convex wall between the center portion and the side portions.

In yet another embodiment of the disclosure, a snowmobile comprises a frame; a powertrain coupled to the frame; a track coupled to the powertrain for propelling the vehicle; the powertrain comprising a power source and a transmission, the transmission having a housing with at least one shaft therein with gears of the transmission and an idle shaft coupled to the at least one shaft, the idler shaft extending through the housing; a brake rotor coupled to the idler shaft; and a brake caliper coupled to the frame and positioned around the brake rotor.

In a further embodiment of the disclosure, a snowmobile comprises a frame; a powertrain coupled to the frame at a forward portion of the frame; a radiator positioned forward of the powertrain and angled relative to a vertical axis; and a hood positioned over the radiator enclosing the front portion of the snowmobile.

In another embodiment, a snowmobile comprises a chassis having a front bulkhead and a tunnel; the tunnel having a center section and side walls; a structural member positioned at an end of the tunnel sidewall and between the sidewalls; and a tubular strengthening member coupled to the tunnel sidewall and to the structural member.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

FIG. 14C is an exploded view showing the tubular strengthening member of FIG. 14B;

Figure 1:
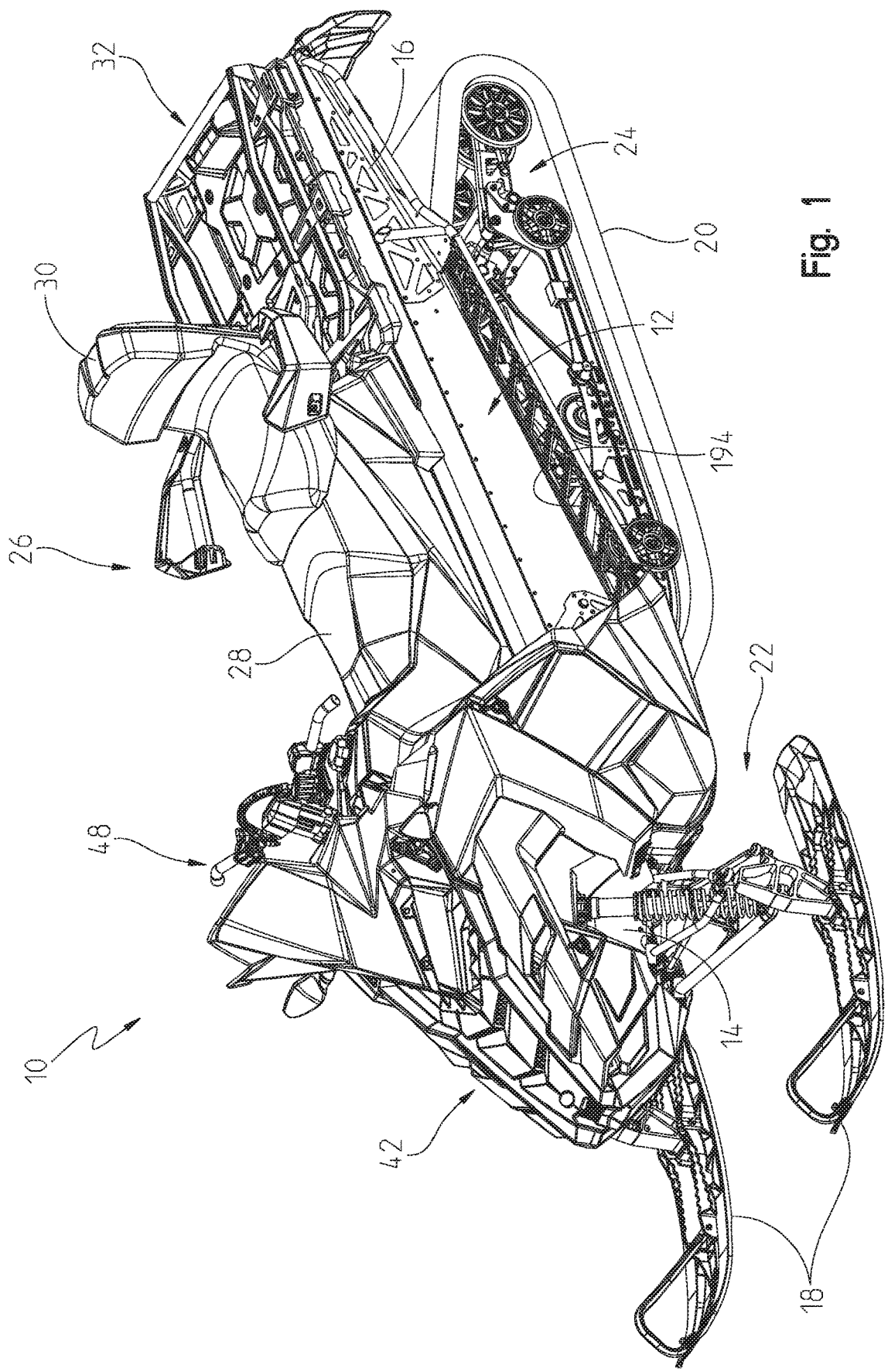
FIG. 1 is a front perspective view of an illustrative snowmobile of the present disclosure.

Corresponding reference characters indicate corresponding parts throughout the several views. Although the drawings represent embodiments of various features and components according to the present disclosure, the drawings are not necessarily to scale and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principles of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. For example, while the following description refers primarily to a snowmobile, it should be understood that the principles of the invention apply equally to other snow vehicles. While the present invention primarily involves a snowmobile, it should be understood, however, that the invention may have application to other types of vehicles, such as motorcycles, ATVs, utility vehicles, scooters, and mopeds.

Referring to FIG. 1 an illustrative embodiment of a snowmobile 10 includes a chassis or frame 12 including a front frame portion 14 and a rear frame portion 16. Front frame portion 14 is supported by front ground-engaging members, illustratively skis 18, and rear frame portion 16 is supported by a rear ground-engaging member, illustratively an endless track 20. Front skis 18 are operably coupled to a front suspension assembly 22, and endless track 16 cooperates with a rear suspension assembly 24. Snowmobile 10 also includes a seat assembly 26 including a driver's seat 28 and an optional passenger seat 30 as further described herein. A rear rack assembly 32 is positioned rearwardly of the passenger seat 30 and is coupled to the rear frame portion 16 as described herein.

Figure 2:
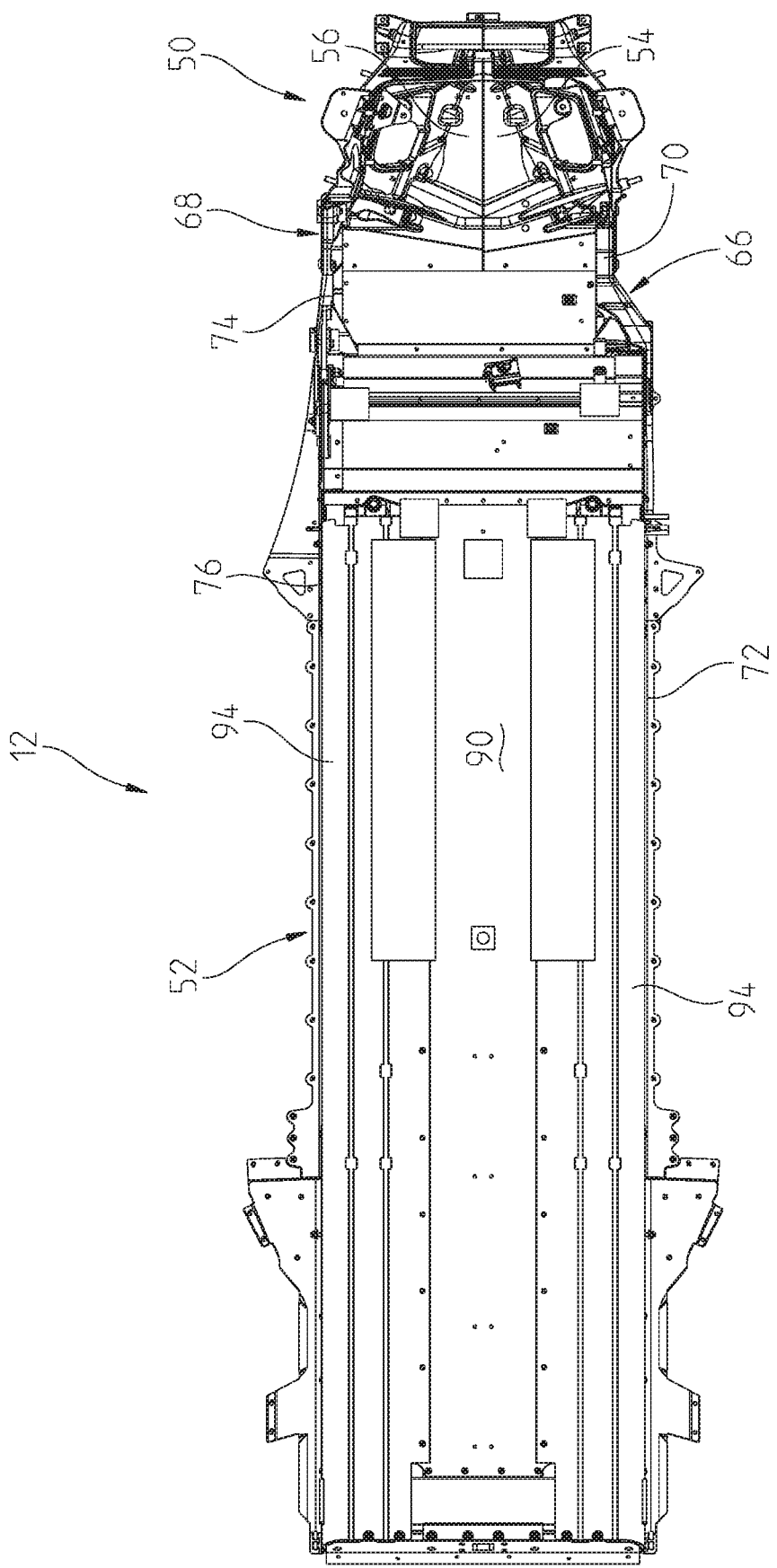
FIG. 2 is a top plan view of the frame.
Figure 3:
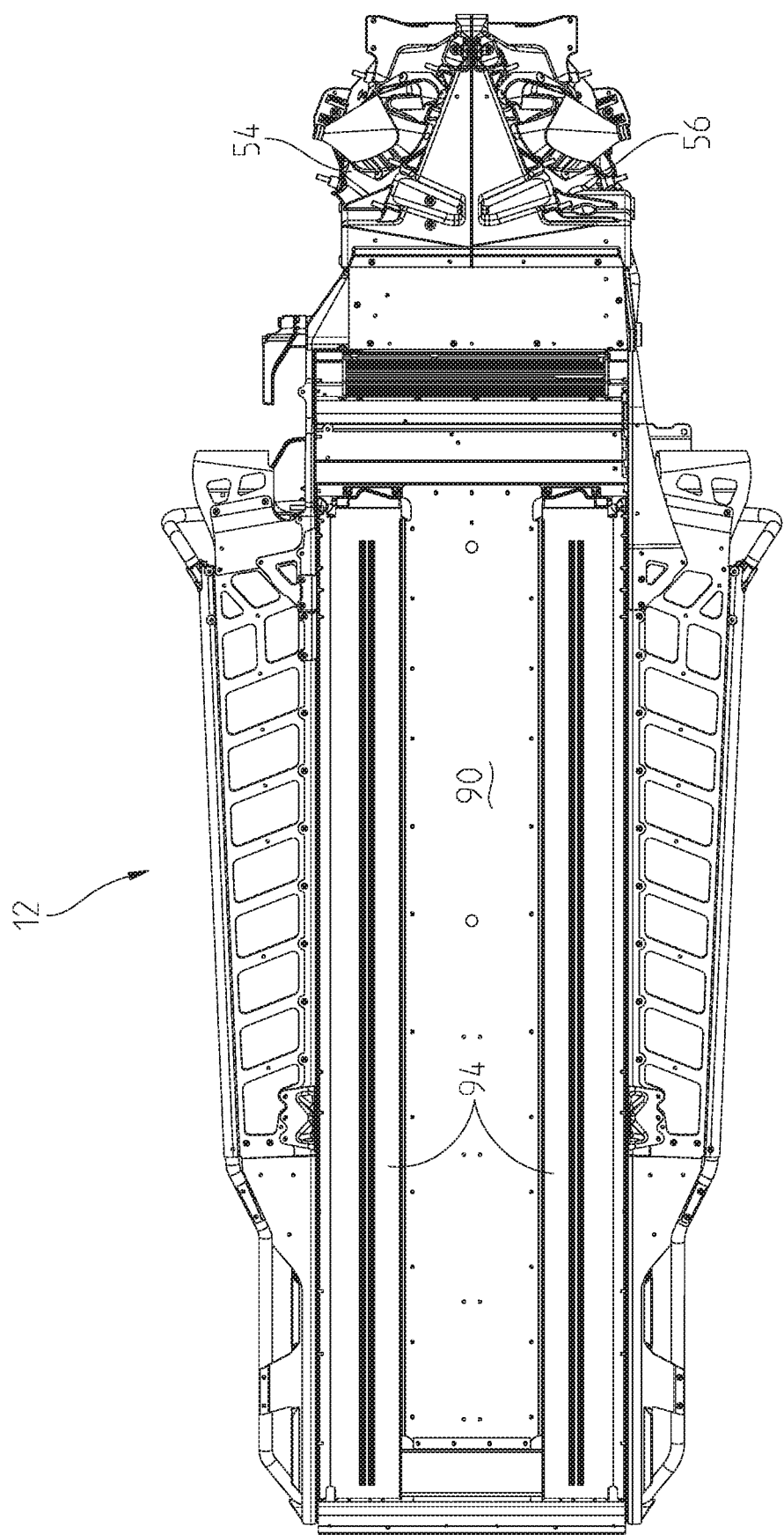
FIG. 3 is a bottom plan view of the frame.
Figure 4:
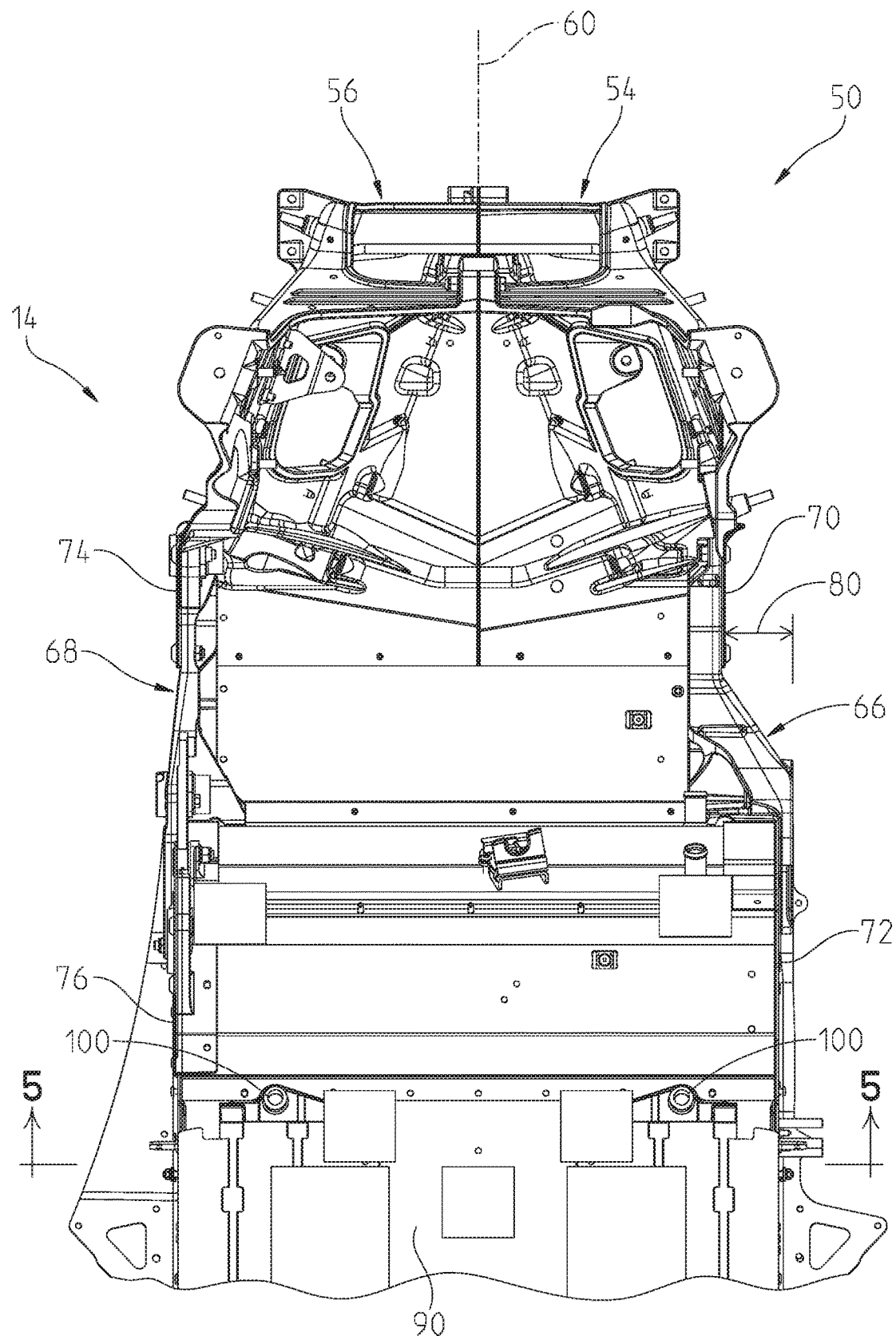
FIG. 4 is an enlarged portion of the frame shown in FIG. 2.
Figure 5:
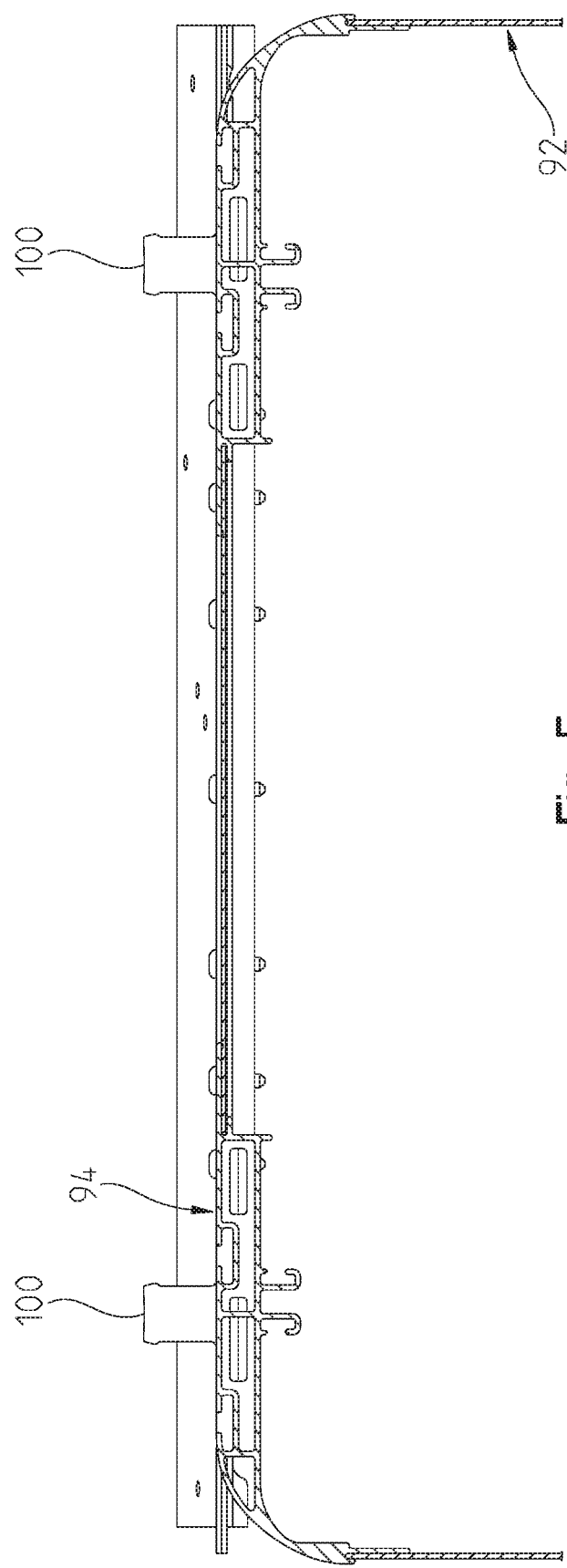
FIG. 5 is a cross-sectional view through lines 5-5 of FIG. 4.
Figure 6:
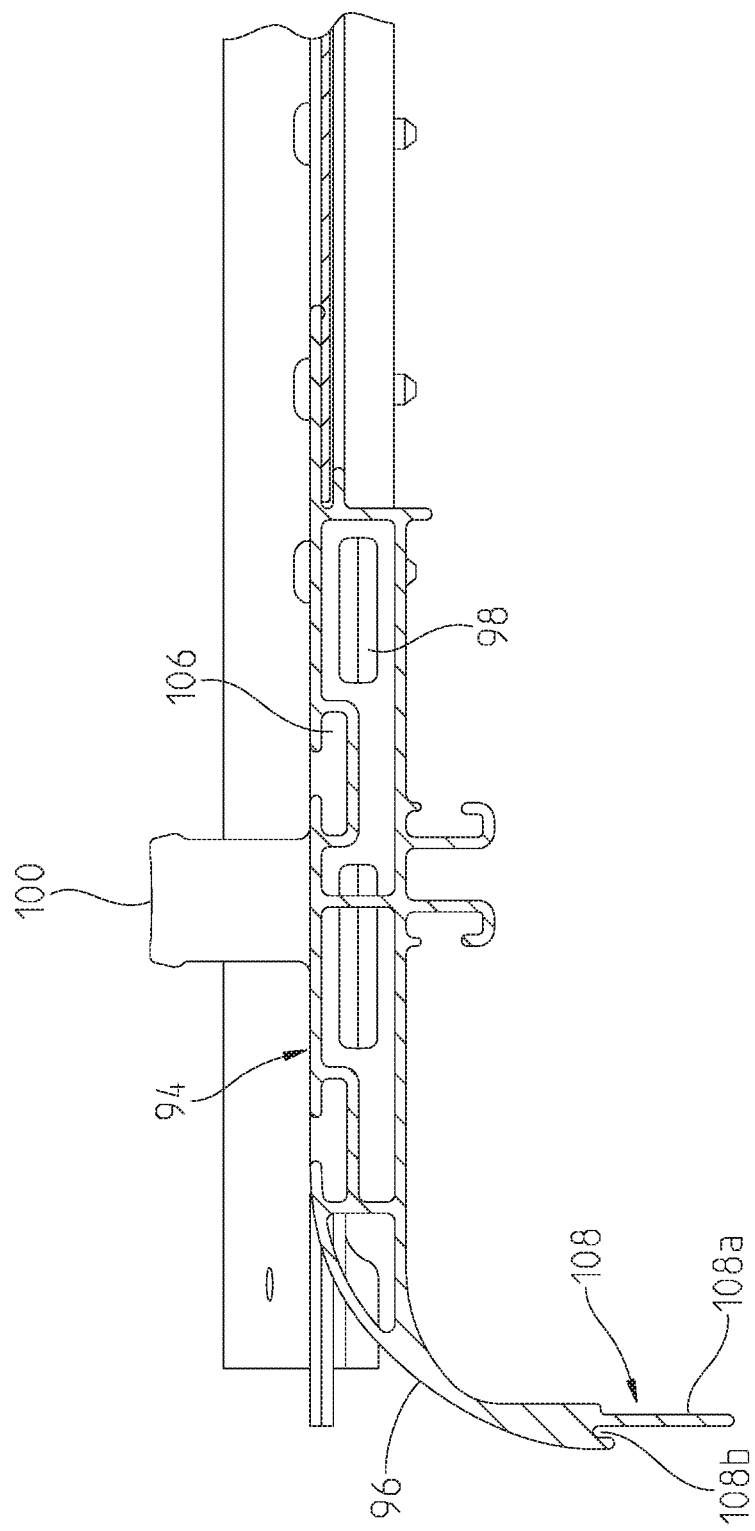
FIG. 6 is an enlarged view of a portion of the frame shown in FIG. 5.
Figure 20:
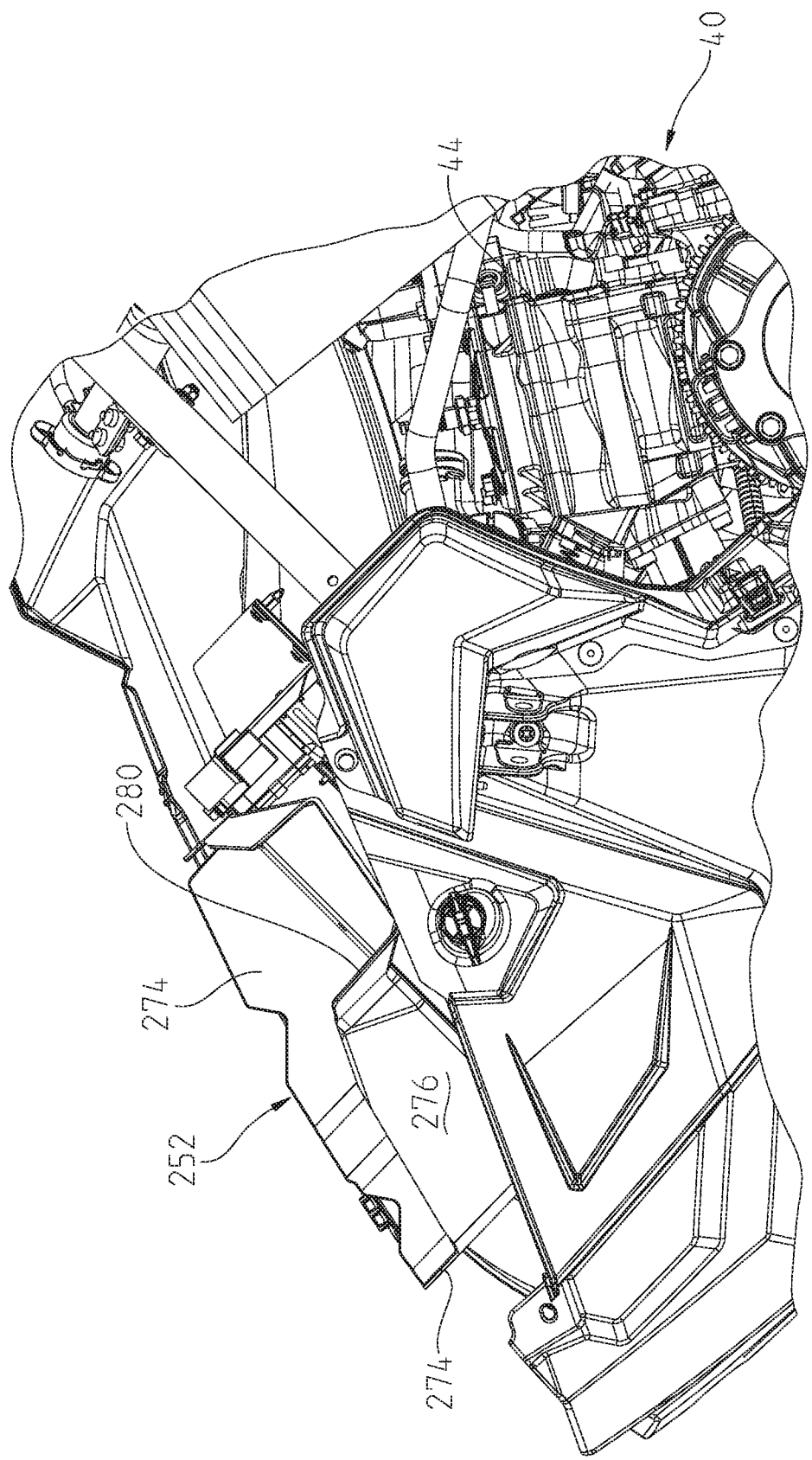
FIG. 20 is a side view of the radiator of FIG. 18.
Figure 21:
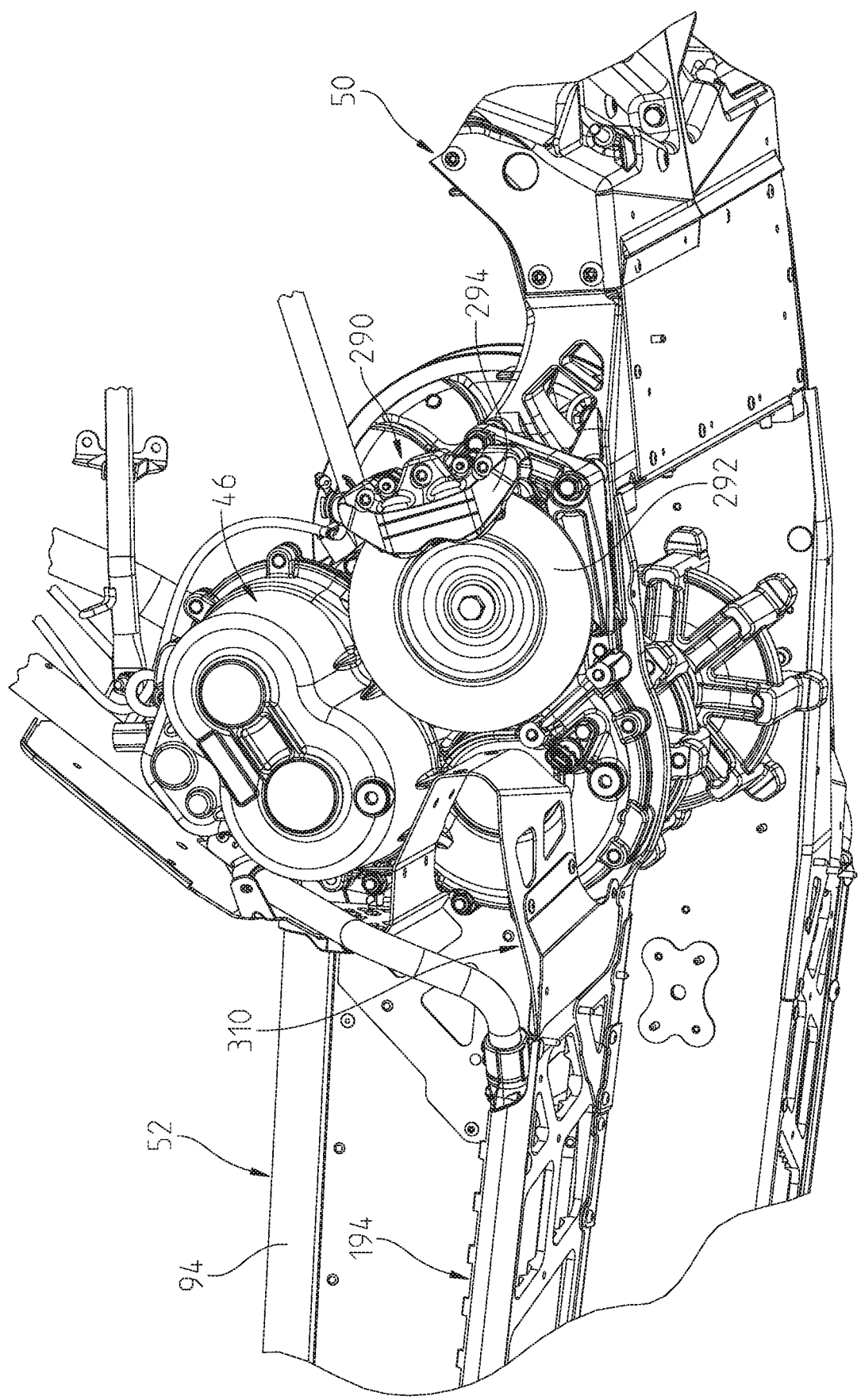
FIG. 21 is an underside perspective view of the transmission and braking system.
Figure 22:
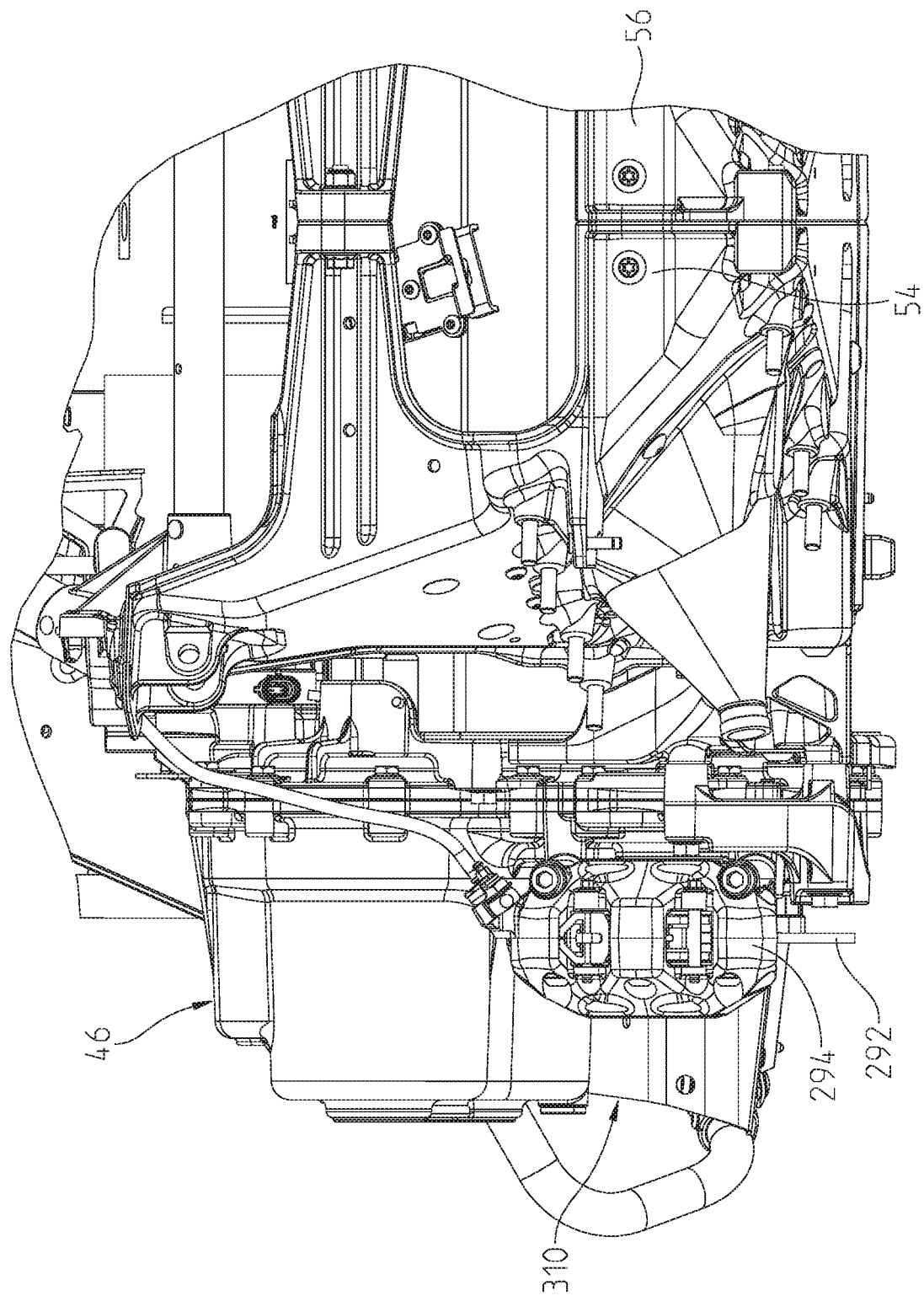
FIG. 22 is a front view of the transmission and braking system.
Figure 23:
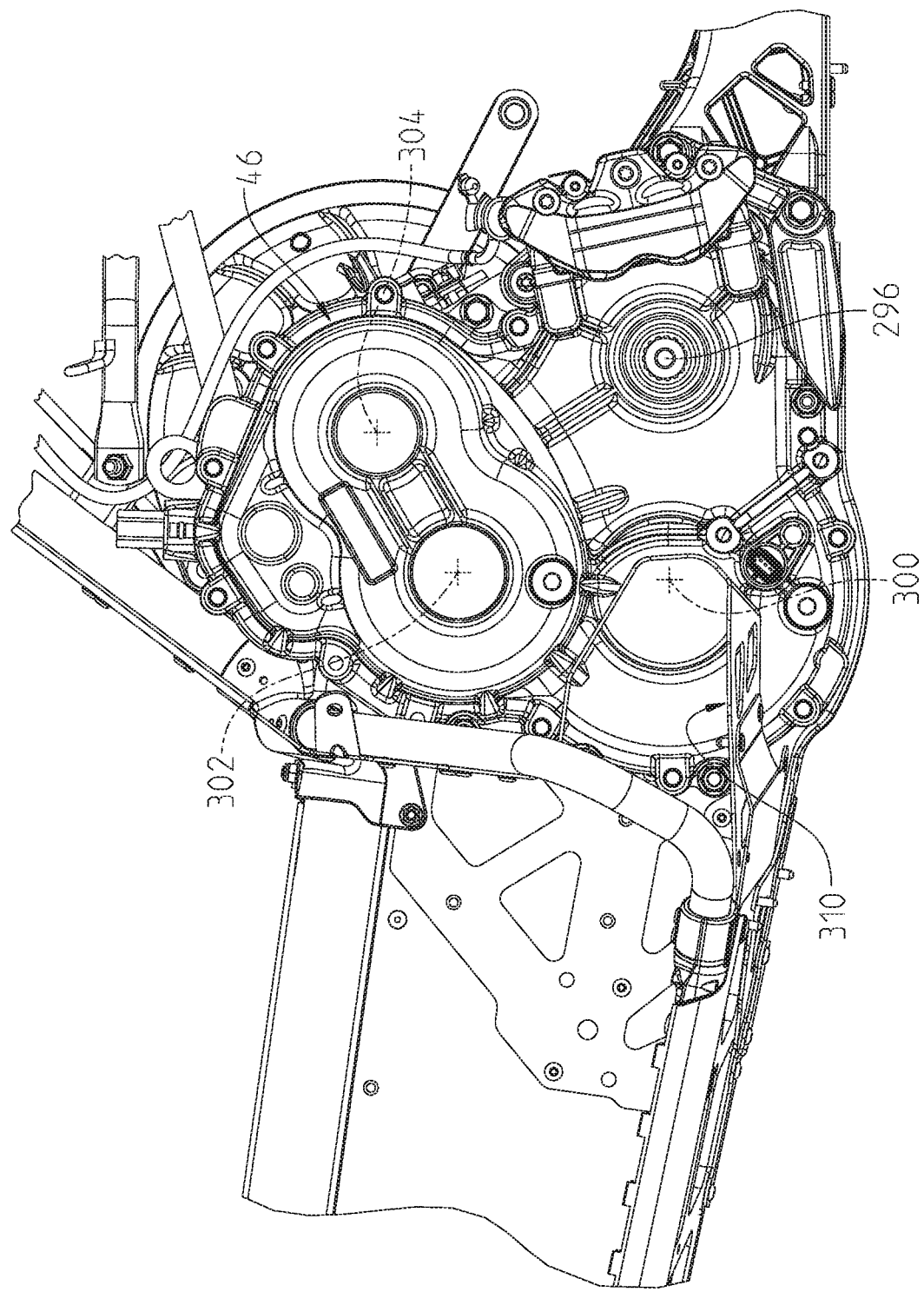
FIG. 23 is a side view of the transmission and braking system with the brake disk removed.
Figure 24:
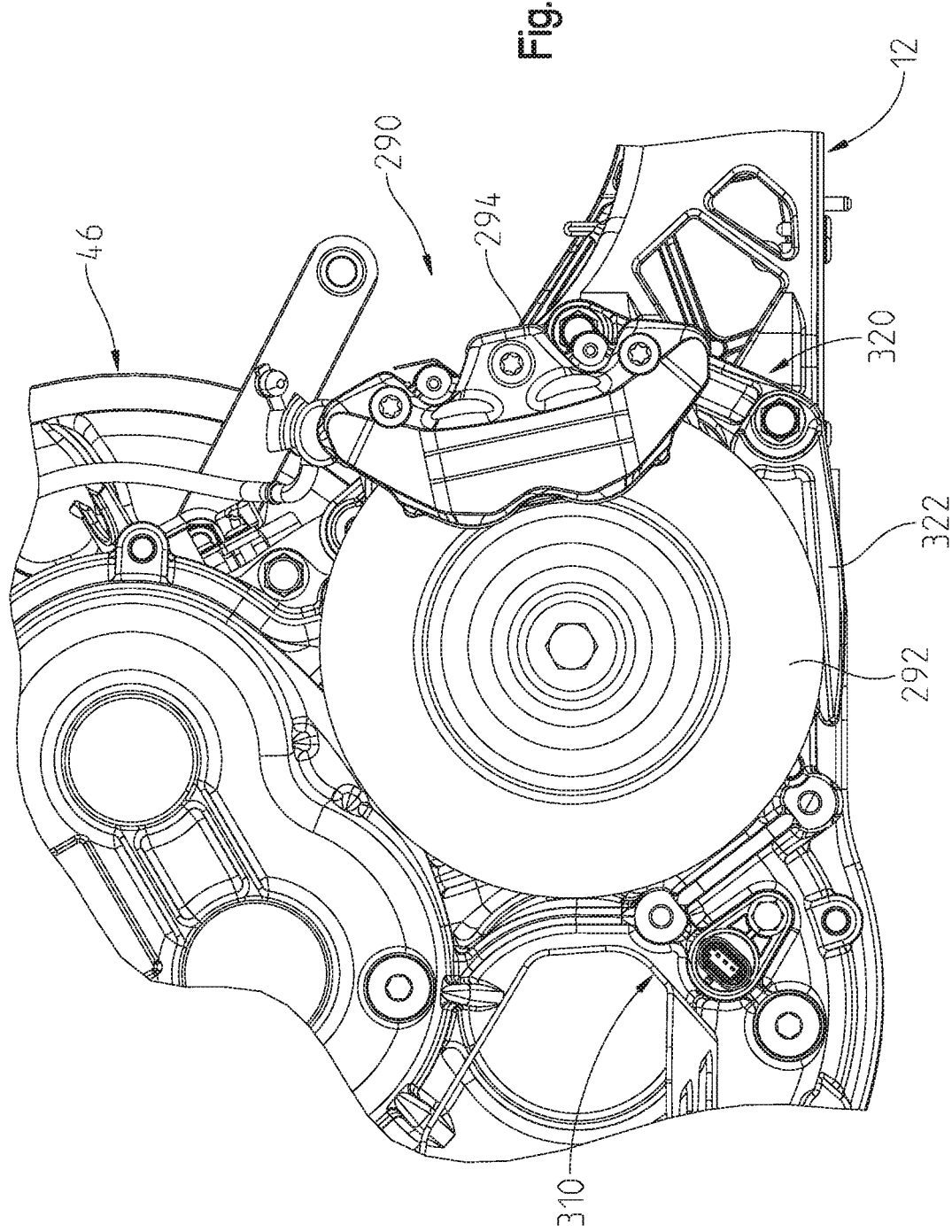
FIG. 24 is a side view of the transmission and braking system similar to that shown in FIG. 21 showing a brake disk guard.
Figure 25:
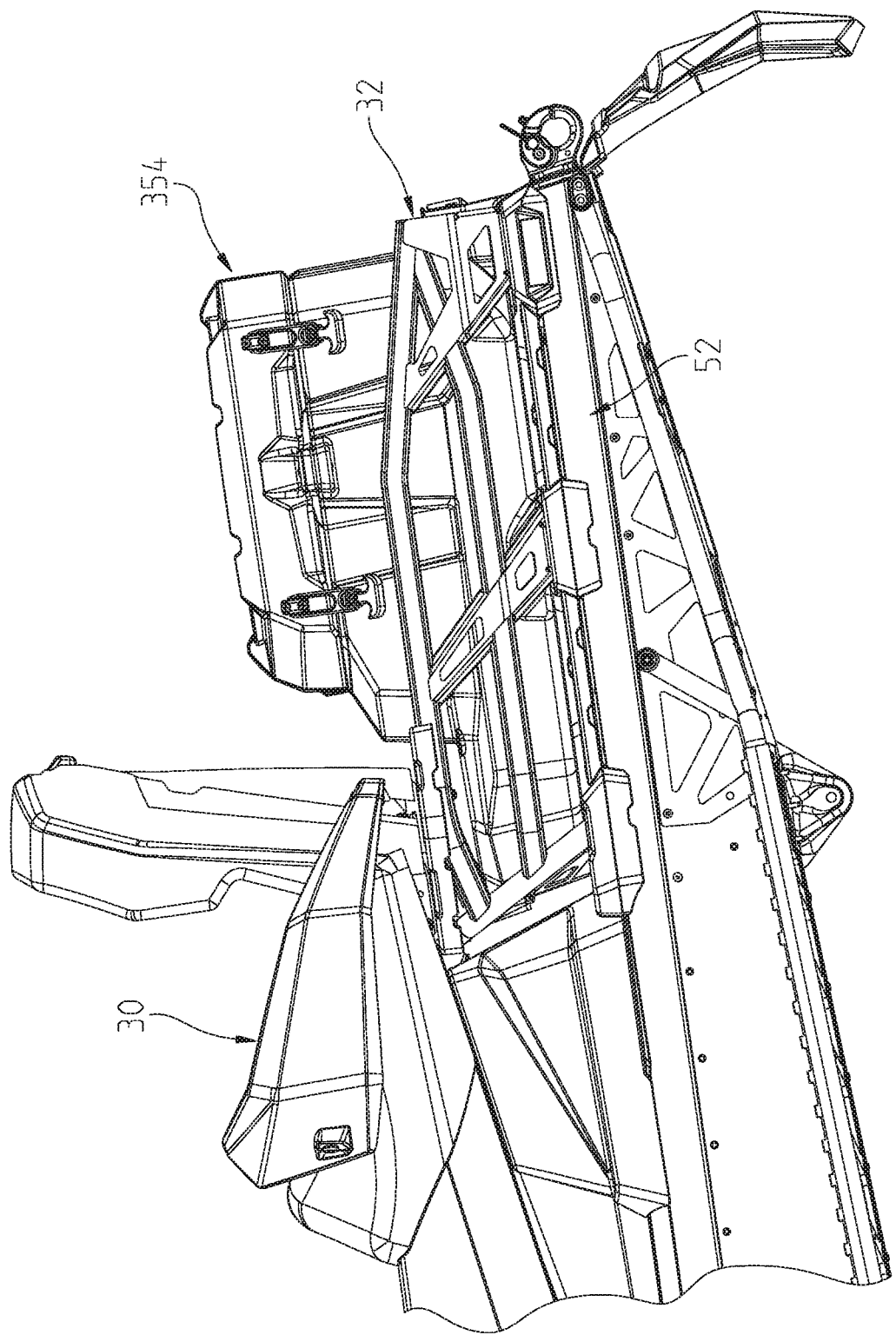
FIG. 25 is a side view of a rear rack assembly.

Referring to FIGS. 1, 20 and 21, a power train unit 40 (FIG. 20) is covered by an outer body 42 (FIG. 1) and provides power to endless track 20 to move snowmobile 10. As shown in FIG. 20, power train unit 40 is supported by front frame portion 14 and includes an engine 44 and a transmission 46 (FIG. 21). Transmission 46 as disclosed has high low gears as well as reverse. As shown in FIG. 1, snowmobile 10 also comprises a steering assembly 48. With reference now to FIGS. 2-4, the frame 12 will be described in greater detail.

With reference now to FIGS. 2-4, frame 12 includes a bulkhead 50 coupled to a tunnel 52. Bulkhead 50 comprises a front casting having right and left castings 54 and 56. Castings 54 and 56 are commonly referred to as cast clips. As shown in FIG. 4, cast clips 54 and 56 couple along a longitudinal mating axis, shown as 60. As shown, the cast clips 54, 56 are asymmetric with the left cast clip 56 being wider than the right cast clip 54. This is due to the fact that the right cast clip 54 is from a narrow track vehicle (15") in order to minimize the number of new parts required. For example, the right cast clip is for a vehicle such as that shown for example in U.S. Pat. No. 8,490,731, the subject matter of which is incorporated herein by reference. The left cast clip 56 is a new component, and is wider than cast clip 54.

With reference still to FIGS. 2-4, tunnel 52 is shown coupled to the bulkhead 50. The right cast clip 54 is shown coupled to the tunnel 52 by way of a first transition piece 66 and the left cast clip 56 is coupled to the tunnel 52 by way of second transition piece 68. Second transition piece 68 is also a component which is already available for a vehicle such as that shown for example in U.S. Pat. No. 8,490,731, the subject matter of which is incorporated herein by reference. As shown, an outer edge 70 of the first cast clip 54 is coupled to a first outer edge 72 of the tunnel, and an outer edge 74 of the second cast clip 56 is coupled to a second outer edge 76 of the tunnel. That is, first transition piece 66 couples the outer edge 70 of the first cast clip 54 to the outer edge 72 of the tunnel 52, and the second transition piece 68 couples the outer edge 74 of the second cast clip 56 to the second outer edge 74 of the tunnel 52. As shown, the first transition piece 66 flares outwardly to space the first outer edge 72 of the tunnel 52 from the outer edge 70 of the first cast clip 54. This is to make up the width difference of the left cast clip 56. As shown, outer edge 72 is spaced apart from outer edge 70 by a distance shown at 80. The end result of this assembly is that the tunnel 52 is wide enough to accommodate the wide track belt of 20". It should be understood that while the present disclosure relates to a wide track snowmobile of 20" from a 15" track, it is possible to use the present disclosure to modify a snowmobile from a range of approximately 12" to a width of 28".

With reference now to FIGS. 2-6, tunnel 52 will be described in greater detail. As shown, tunnel 52 is comprised of multiple parts coupled together, namely tunnel 52 is comprised of a center portion 90, side portions 92 and a transition portion 94. Transition portion 94 has also multiple functions.

First, the transition portion 94 is providing the 90° bend between the center portion 90 and the side portions 92. Transition portion 94 is also providing a rounded corner at 96 defining a convex wall to provide a better ergonomic feel for the driver, as the driver's legs straddle the tunnel 52. Transition portion 94 is also providing a heat exchange function where the transition portions have internal water passages 98 for cooling water to circulate and be cooled by the tunnel. The water circulates through the tunnel by inlet and outlet passages 100, which couple to the engine 44 through hoses (not shown). The water circulates through internal channels 98 (FIG. 6), to make a U-shaped flow pattern in and out of the tunnel 52 to cool engine 44. The channels extend along a substantial length of the tunnel 52 as shown best in FIGS. 2 and 3. This cooling function is more thoroughly described in our U.S. Pat. No. 7,353,898. Transition portion 94 is also providing a retention function having slots at 106 to receive a head of a fastener. Finally, transition portion 94 provides a coupling portion 108 having an extension 108a forming a slot 108b (FIG. 6) for receiving side portion 92, as further described herein.

Figure 7:
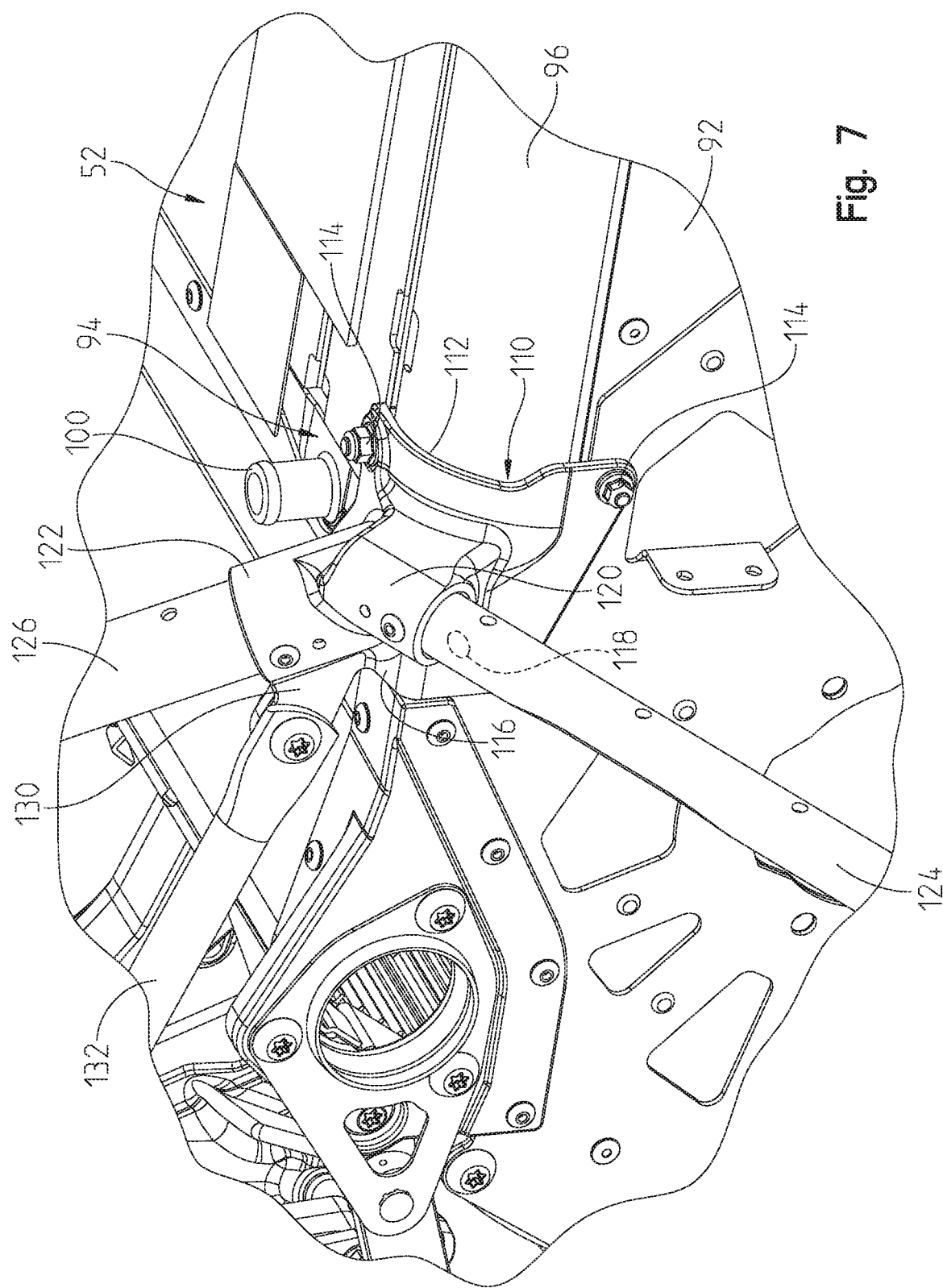
FIG. 7 is a perspective view of a corner post coupled to the tunnel.

With reference now to FIG. 7, a cast coupler is shown at 110 which couples to the corner 96 of the transition portion 94 and includes a concave portion at 112 to overlie the corner 96. Cast coupler 110 is coupled to the tunnel 52 by way of fasteners at 114. Cast coupler 110 also includes a right-angled portion at 116 to couple to the tunnel 52 by way of fasteners at 118. Cast coupler 110 also includes tube connectors 120 and 122 which couple corresponding frame tubes 124 and 126. Cast coupler 110 also includes a tab at 130 to couple to a frame tube 132.

Figure 8:
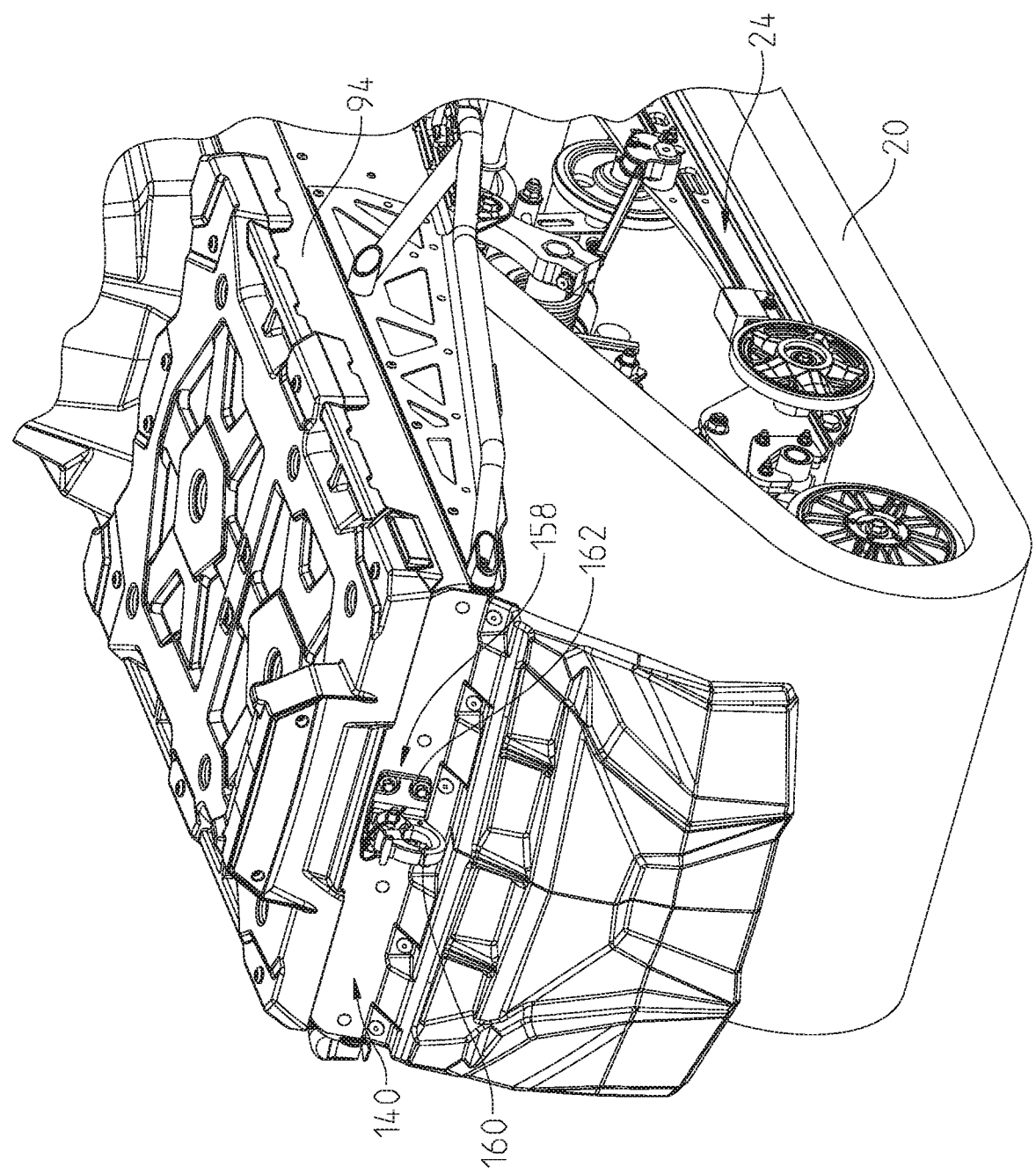
FIG. 8 is a rear perspective view of the snowmobile tunnel.
Figure 9:
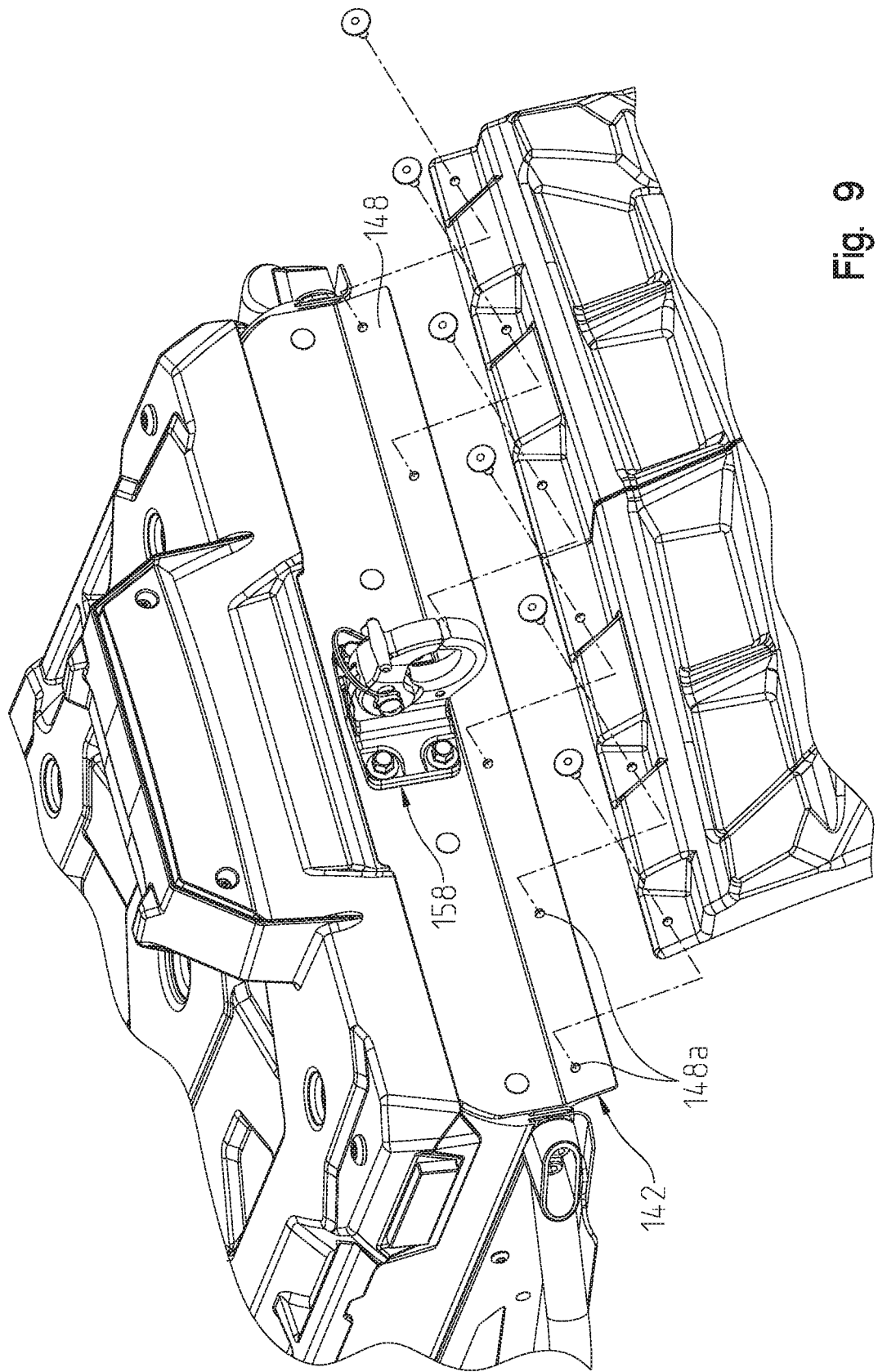
FIG. 9 is a partially exploded view of the rear portion of the tunnel shown in FIG. 8.
Figure 10:
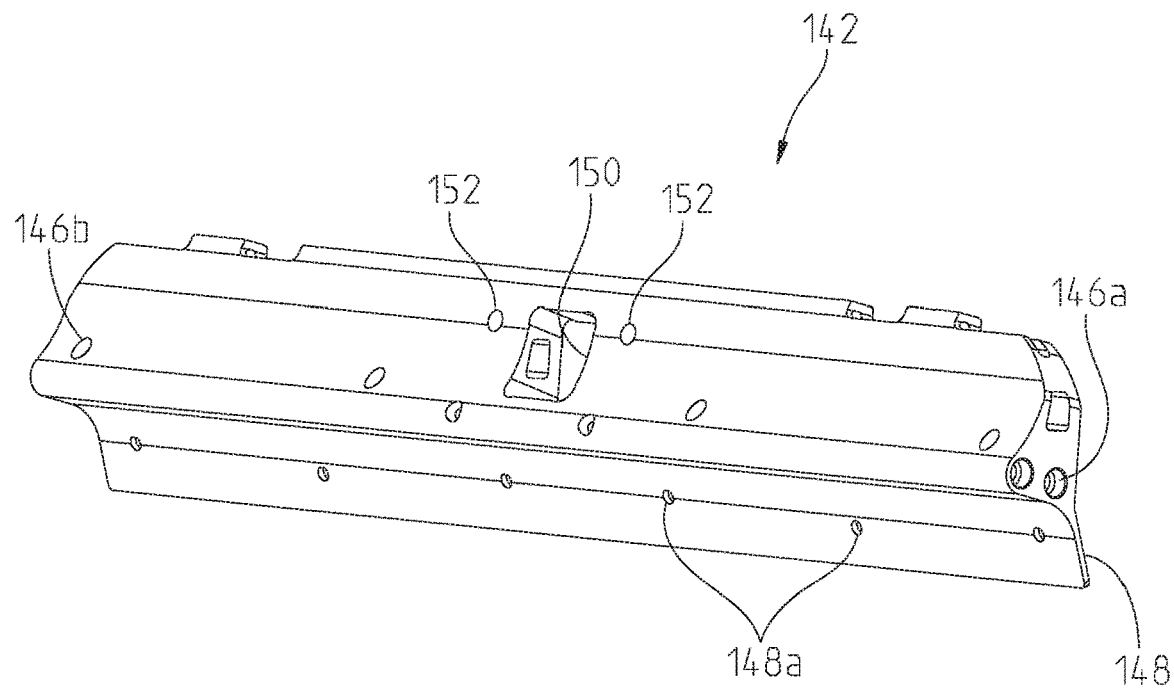
FIG. 10 is a perspective view of the extruded bar shown in FIG. 9.
Figure 11:
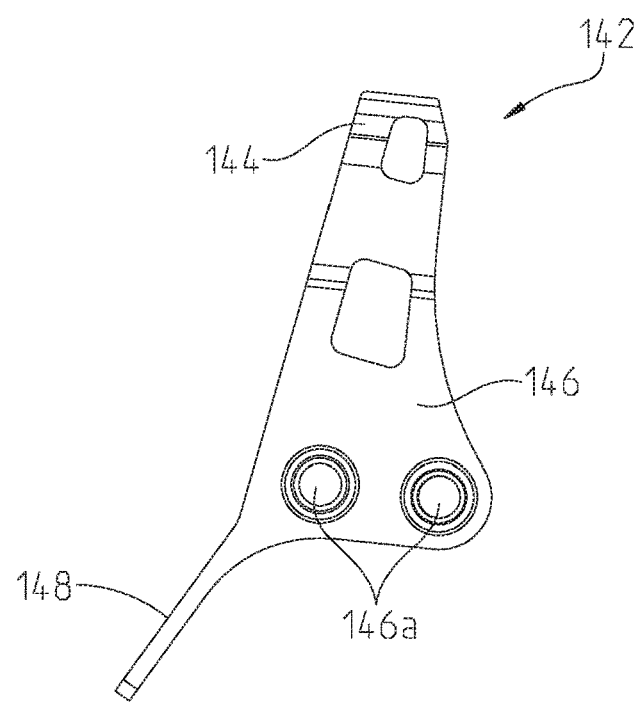
FIG. 11 is an end view of the extruded bar shown in FIG. 10.

With reference now to FIGS. 8-11, a rear of the tunnel is shown as including a tow ring attachment 140 which couples to an extruded close off 142. (FIGS. 9-11). As shown in FIGS. 10 and 11, close off 142 is comprised of an extruded bar having an upper portion 144, lower portion 146 and a trailing portion 148 having apertures 148a. Lower portion 146 includes apertures 146a (FIG. 11) and apertures 146b (FIG. 10). Extruded close off 142 also includes a receiving opening 150 having apertures 152. Opening 150 is a square machined hole for for the hitch receiver to slide into, although alternate shapes could also be used. As shown in FIG. 8, tow ring attachment 140 includes a tow ring bracket or pintle at 158 with a tow ring 160 where the tow ring bracket 158 couples to the extruded close off 142 by way of fasteners 162, which couple with apertures 152. Alternatively, the pintle 158 could be a square receiver/standard hitch receiver.

Figure 12:
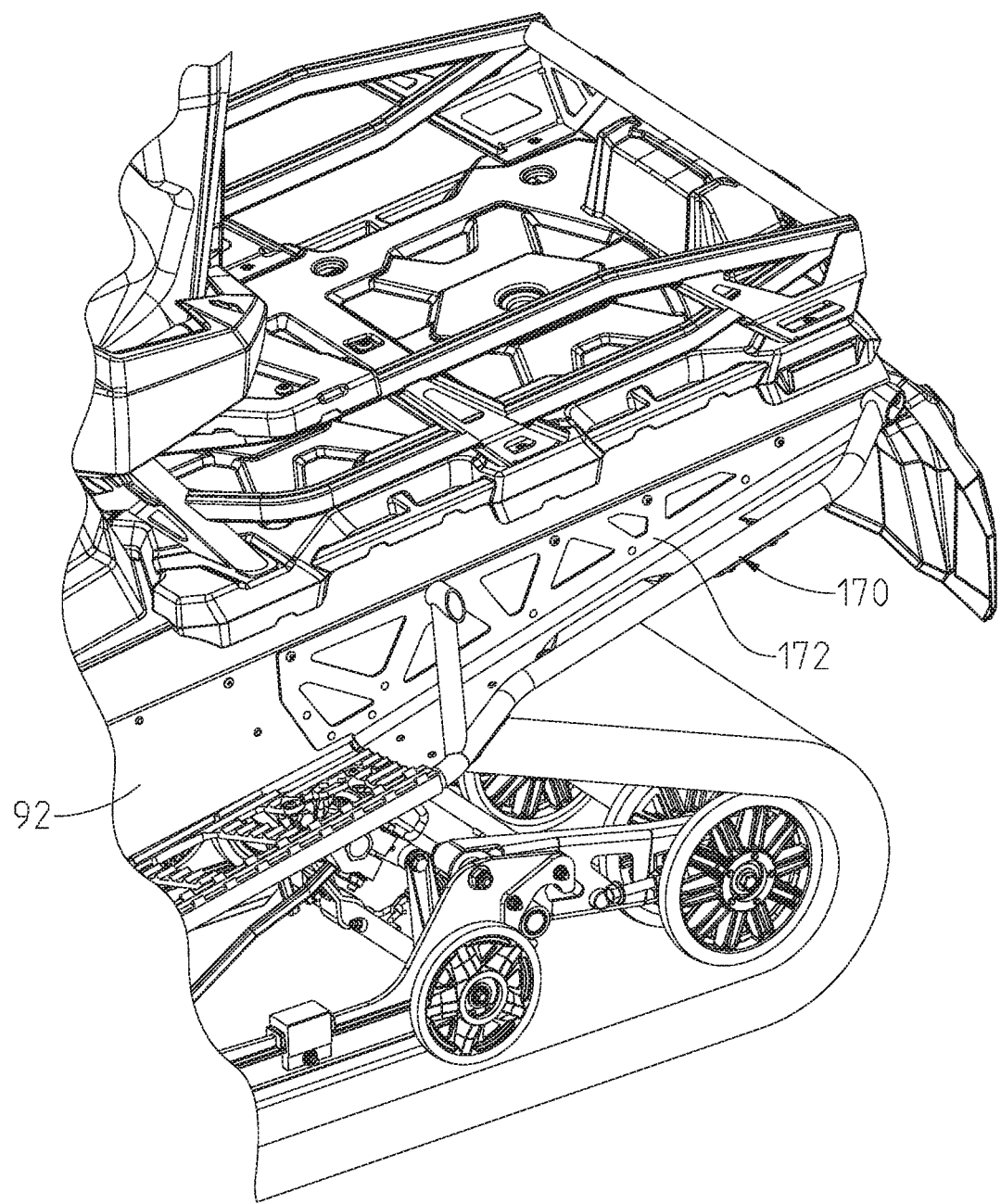
FIG. 12 is a front left perspective view showing a tubular strengthening member.
Figure 13:
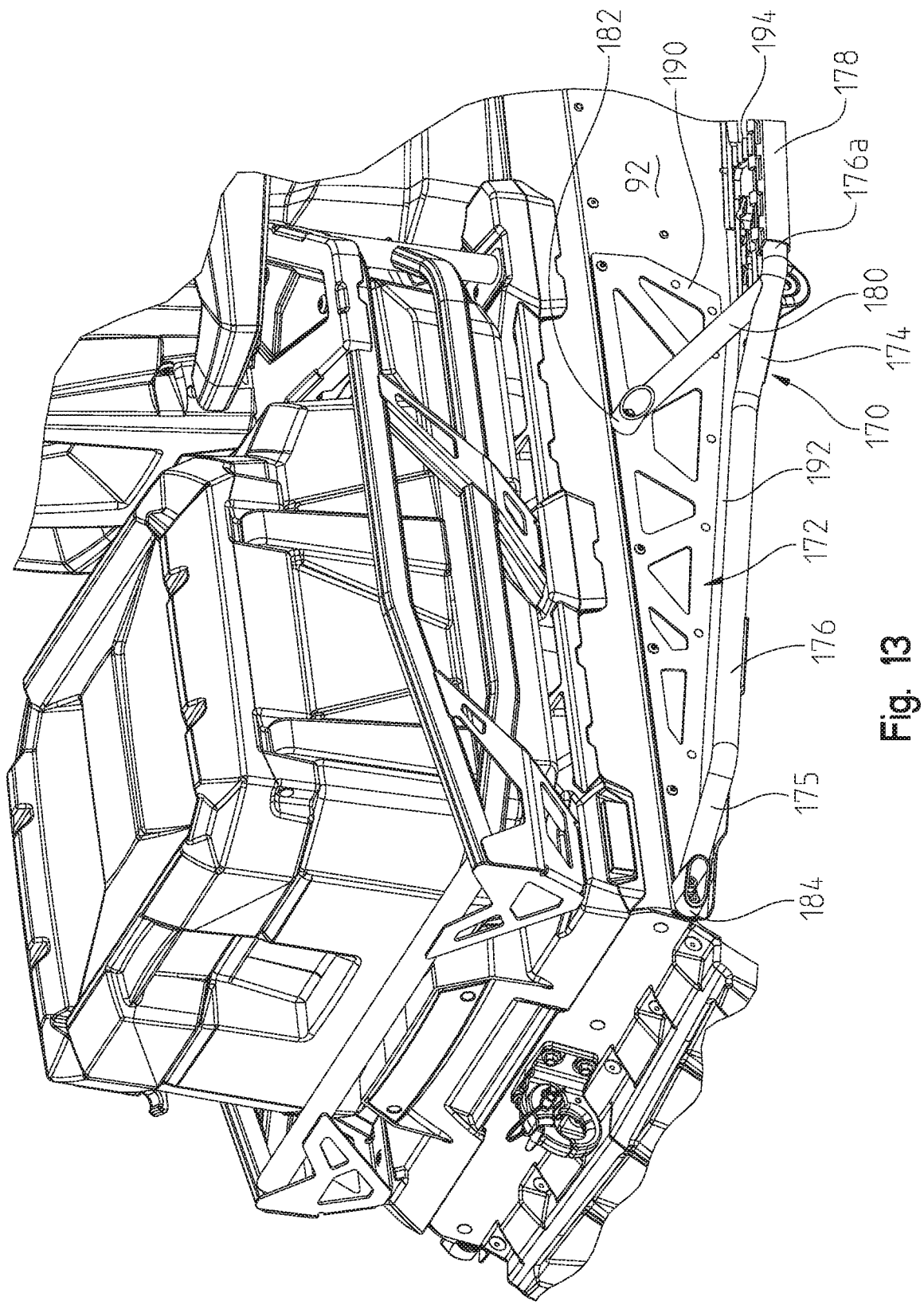
FIG. 13 is a rear right perspective view showing the tubular strengthening member.
Figure 14A:
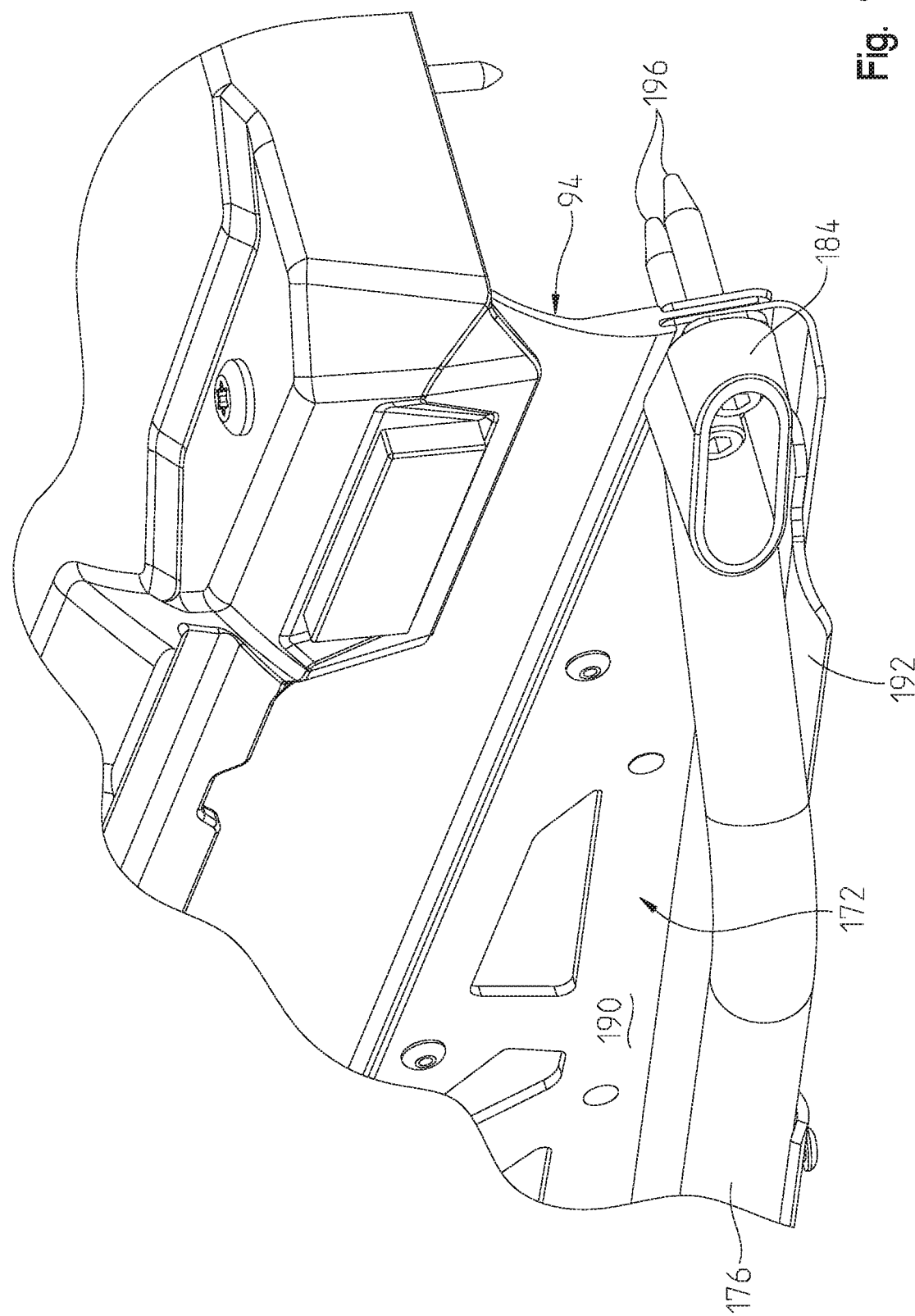
FIG. 14A is a rear left perspective view showing an end of the tubular strengthening member.

With reference now to FIGS. 12-14, a rear tubular strengthening member is shown at 170 which cooperates with side panel 172 which is positioned over side panel 92 of tunnel 52. As shown in FIG. 13, rear tubular strengthening member 170 is comprised of tubular members 174, 175 and 176 welded together to form a solid member. Tubular strengthening member 170 also comprises a front end 176a, received in and forming an extension with, the running board tubular member 178. Tubular strengthening member 170 extends rearwardly to an end of the tunnel 52. Tubular strengthening member 170 also includes a portion extending upwardly at 180 and couplers 182 and 184 are provided for mounting to side wall 92. Panel 172 includes a portion 190 which lies flush with side panel 92 and a horizontal portion 192 which is generally planar with the running board 194. Tubular strengthening member 170 together with panel 172 help to strengthen the rear of the tunnel as the rear of the tunnel is a cantilevered portion which also requires strengthening because of the towing requirements. As shown in FIG. 14A, fasteners 196 are provided to couple with the extruded close off 142 and particularly into apertures 146a (FIG. 11). It should be understood that tubular strengthening member 170 could also be a cast member.

Figure 14B:
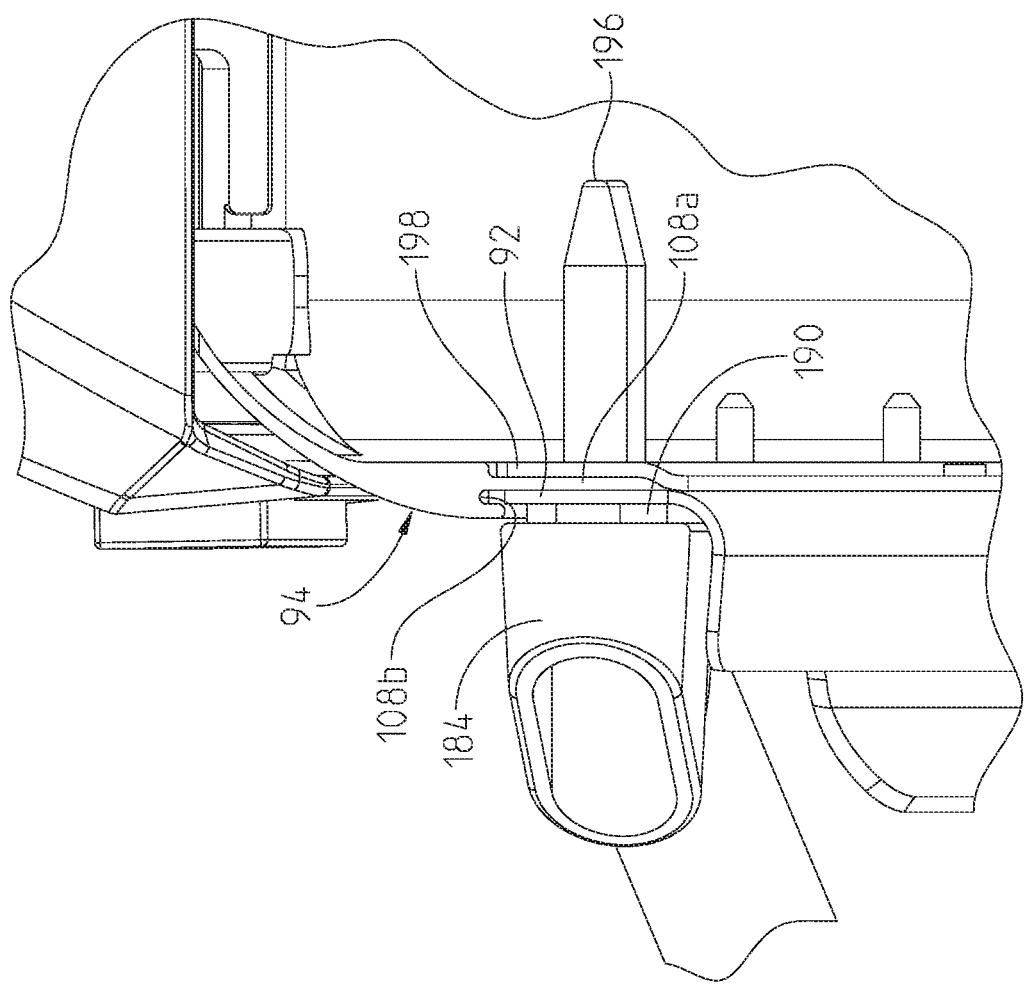
FIG. 14B is an end view of the tubular strengthening member.
Figure 14D:
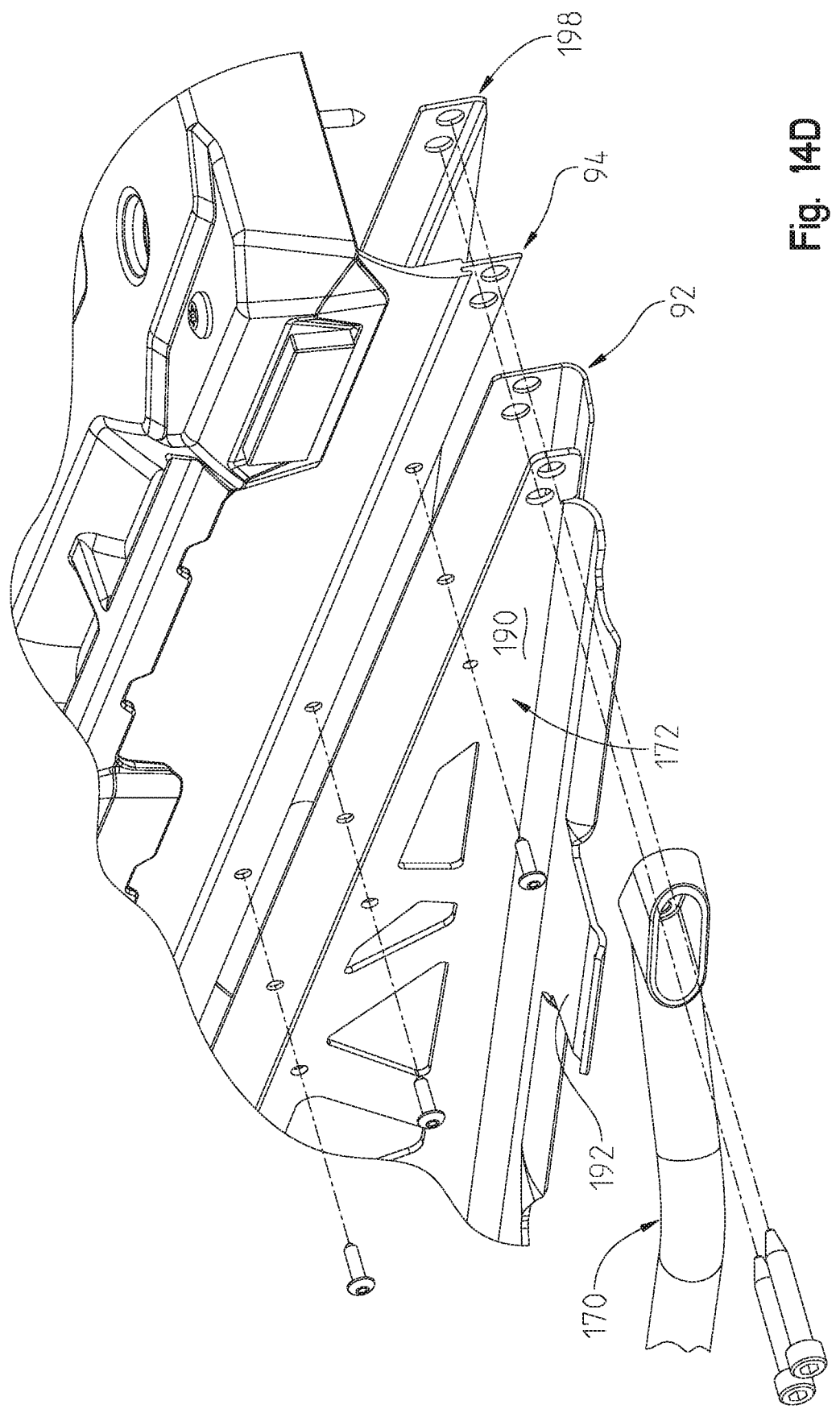
FIG. 14D is an exploded view of the tubular strengthening member.

With reference now to FIGS. 14B-14D, the rear tunnel portion is shown with rigified layers of material including wall portion 190 of panel 172, side wall 92, extension 108, and a structural member in the form of strengthening strip 198. As shown best in FIG. 14B, sidewall 92 is positioned within slots 108b, and coupling portion 184 is positioned against wall 92 of side panel 172. It should be appreciated that FIG. 14B is an end view of the left hand end of the tunnel and that the right hand side would be a mirror image of that shown in FIG. 14B. Fasteners 196 couples the layers of material shown in FIG. 14B together and traps them with extruded close-off 142 trapped therebetween. This provides a significantly strengthened rear tunnel portion for towing and carrying capacity.

Figure 15:
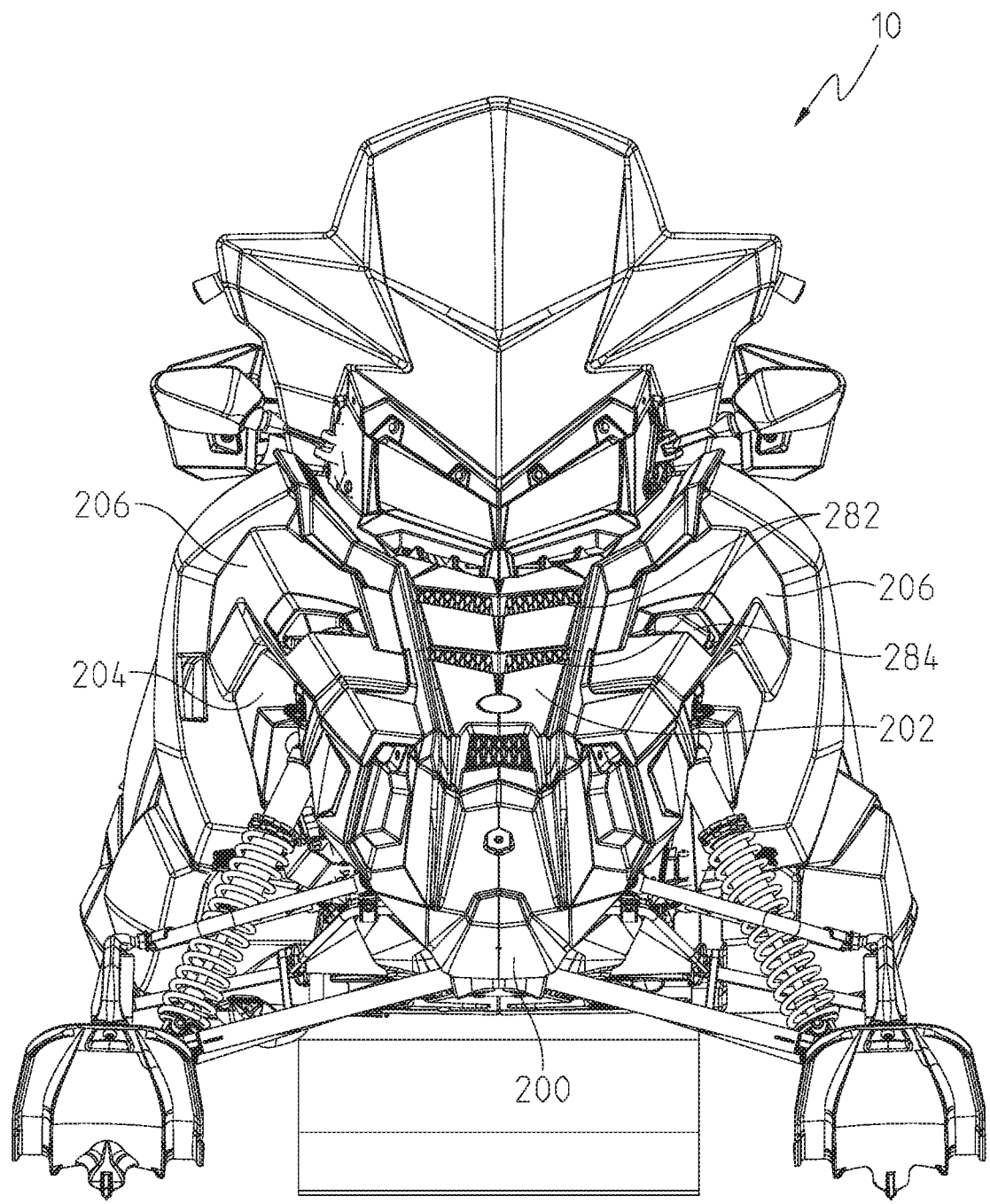
FIG. 15 is a front view of the snowmobile.
Figure 16:
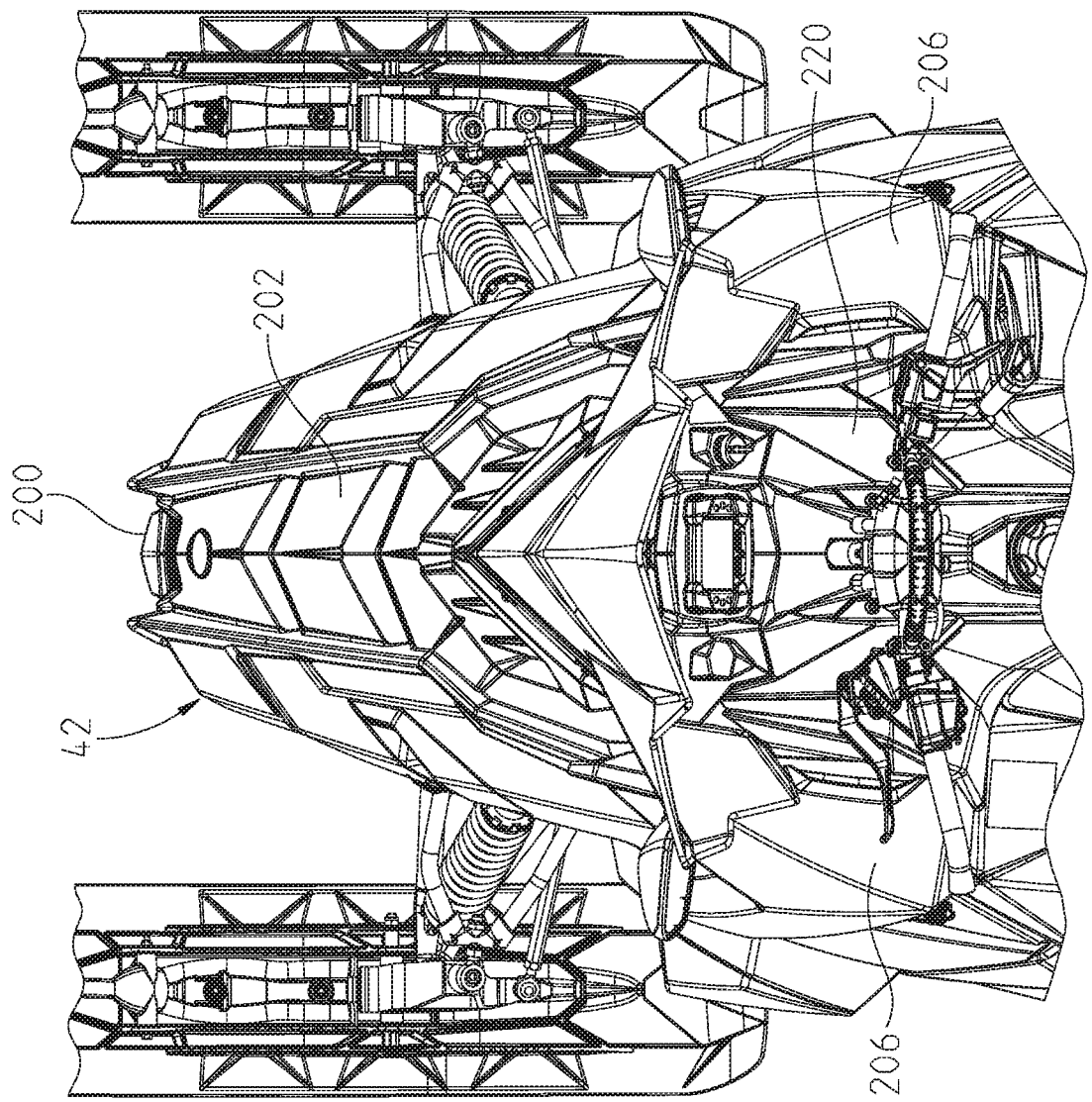
FIG. 16 a top view of the snowmobile.

With reference now to FIGS. 15 and 16, the front outer body 42 will be described in greater detail. As in other aspects of the snowmobile 10, the present disclosure utilizes components from the narrower track vehicle and accommodates their usage in other components. The same is true for the outer body portion 42 as the nose portion 200 and hood 202 are from another vehicle model. Rather the vehicle front outer body 42 is widened by adding new fenders 204 and new side panels 206.

Figure 17:
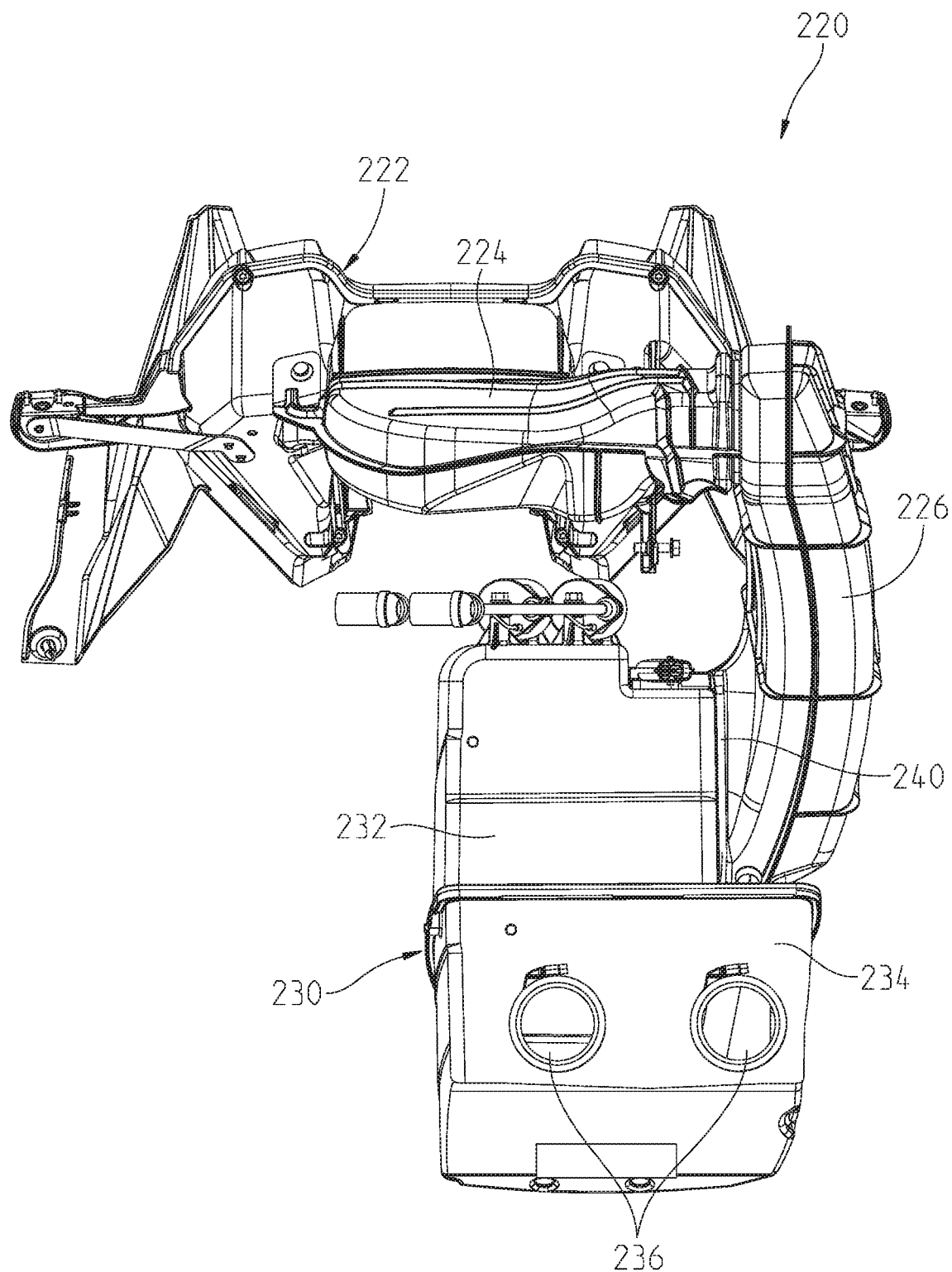
FIG. 17 is a front view of the air intake system.

With reference now to FIGS. 16 and 17, an air intake system 220 for snowmobile 10 is shown which includes plenum 222, first duct portion 224 and second duct portion 226, where duct 226 feeds into air cleaner 230. Air cleaner 230 includes an upper portion 232 and a lower portion 234 where the lower portion has outlets 236 which feed to the throttle bodies (not shown) of engine 44. The plenum 222, ducts 224, 226 and air cleaner lower portion 234 are all utilized from a prior snowmobile model, but in the embodiment disclosed, the engine needed to be moved leftwardly and thus the air cleaner upper portion 232 is notched at 240 by the distance that the engine needed to be shifted. In this manner, the entirety of the air intake system 220, except for the upper air cleaner portion 232 could be utilized from the prior design. It should be appreciated that the air intake system could also be one of the air intake systems shown in U.S. Pat. No. 8,127,877 or US Publication No. 2015/0197313, the subject matter of which is incorporated herein by reference.

Figure 18:
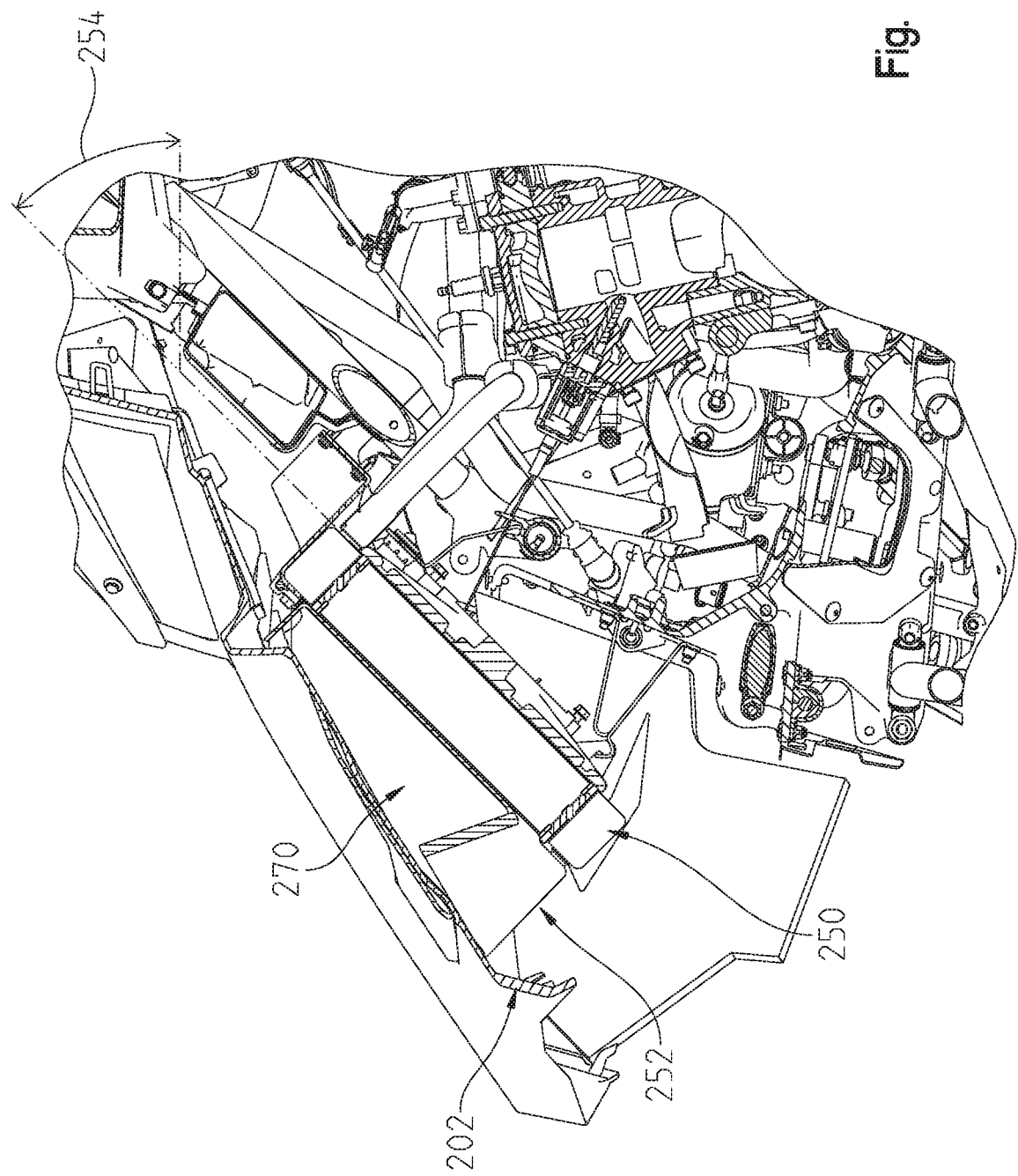
FIG. 18 is a cross-sectional view through a front of the snowmobile showing the radiator.
Figure 19:
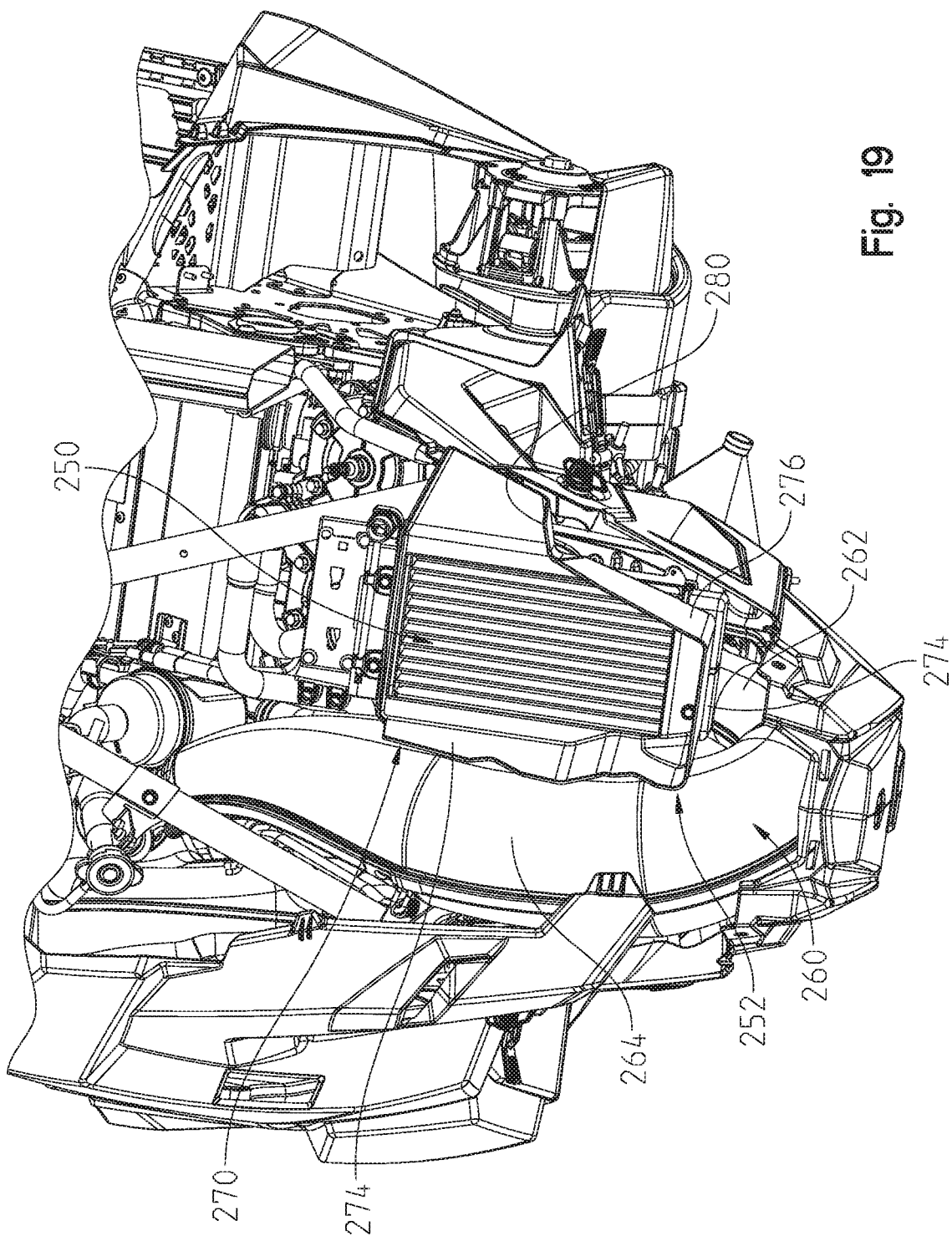
FIG. 19 is a front perspective view of the radiator of FIG. 18.

With reference now to FIGS. 18-20, an engine cooling system will be described in greater detail. As shown first in FIG. 18, engine cooling system is comprised of a radiator 250 and a shroud 252. As shown, radiator 250 is positioned at an angle relative to a horizontal position where the angle is shown at 254. Angle 254 is between 30 and 45° and as shown is approximately 37.5°. By placing the radiator at an angle, the angle of the radiator is designed to melt snow and pass it through the radiator to prevent a wall of snow and ice building up, preventing air from passing through the radiator. Thus, as shown best in FIG. 19, the radiator 250 and shroud 252 are nested around the exhaust system 260 where the radiator sits over a lower portion 262 of the exhaust system 260 and sits to the left of rearwardly extending portion 264 of exhaust system 260. Shroud 252 includes a peripheral wall 270 extending at least partially around the shroud including a right-hand side portion 272, a front portion 274 and a left-hand side portion 276. Shroud 270 also includes an intake duct portion at 280 which feeds air in from the left hand side of the vehicle. As shown best in FIGS. 18 and 19, hood 202 conforms to the top of the shroud and also feeds air into the shroud whereby intake openings 282 (FIG. 15) feed air into the center of the shroud 252 and side opening 284 (FIG. 15) feeds air into the intake duct 280.

With reference now to FIGS. 21-24, the braking system of the snowmobile 10 will be described in greater detail. With reference first to FIG. 21, a braking system is shown at 290 having a brake disc 292 and a brake rotor at 294. Brake disc is coupled to a shaft of the transmission 46 such that braking the vehicle is transmitted through the transmission. More particularly, and as shown best in FIG. 23, where brake disc 292 is shown removed, transmission 46 includes an additional idler shaft 296 which drives the brake disc 292. Three other shafts run transversely within the transmission 46 and would rotate on an axis 300, 302 and 304. Idler shaft 296 is positioned forward of all of the axes 300, 302 and 304 to position the brake disc 292 out of the way of the rider toe hold 310, which is best shown in FIG. 21. Idler 296 would be coupled to one of the three shafts of the transmission to drive the idler shaft 296, such that braking the idler shaft would put a reverse torque the transmission and brake the vehicle 10. As shown best in FIG. 22, brake disc 292 is in lateral alignment with toe hold 310 (shown in phantom) such that if brake disc 292 is not moved forwardly, the brake disc would crowd the space of the toe hold 310. As shown best in FIG. 24, a guard 320 is coupled to the frame 12 and includes a rearwardly extending portion 322 to protect the brake disc 292 from an underside thereof.

Figure 26:
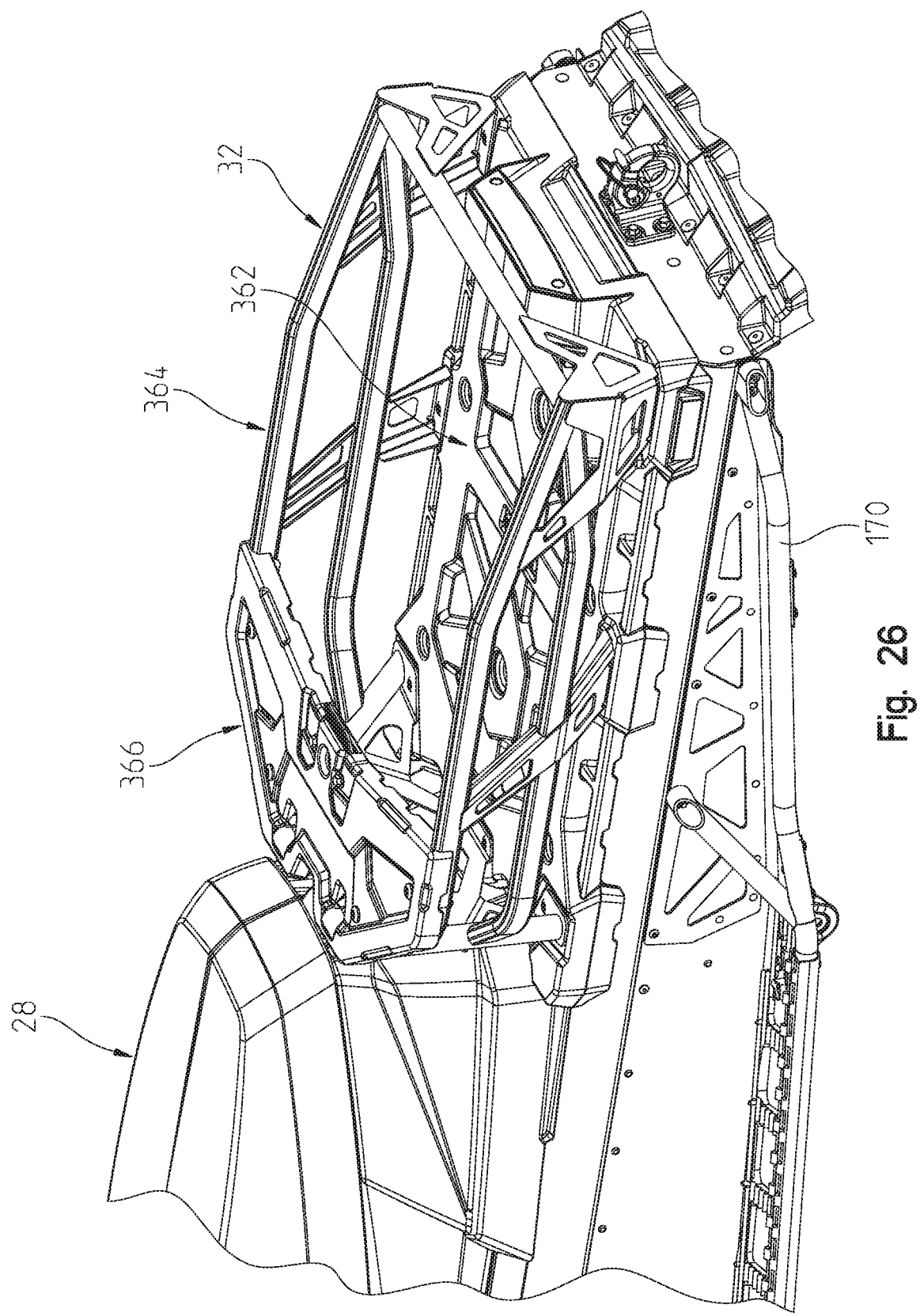
FIG. 26 is a perspective view of the rear rack assembly of FIG. 25.
Figure 27:
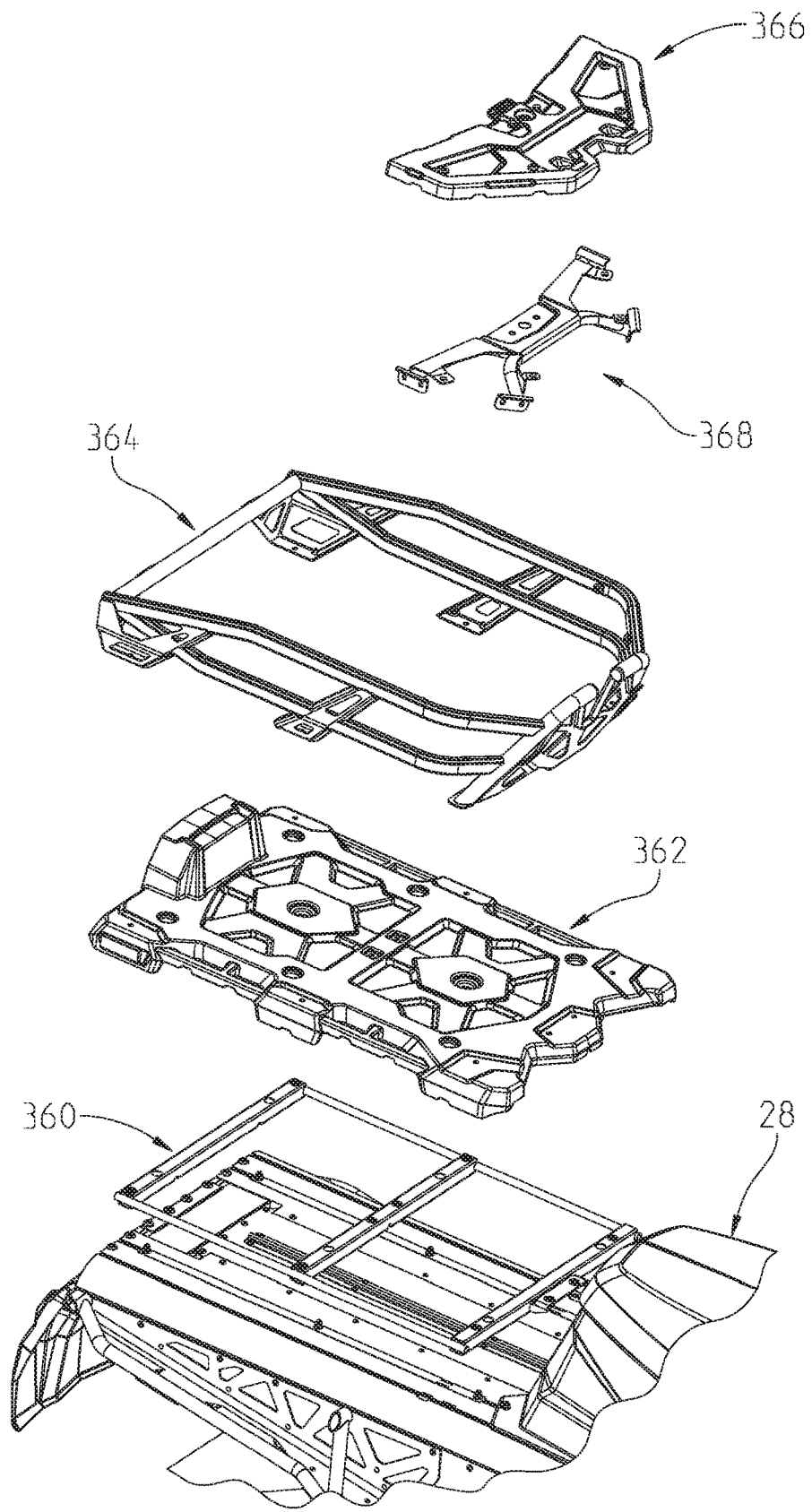
FIG. 27 is an exploded view of the rear rack assembly.

With reference now to FIGS. 25-36, rear rack assembly 32 will be described in greater detail. As shown best in FIG. 25, rear rack assembly 32 is shown coupled to a rear portion of tunnel 52 and is profiled to carry a luggage carrier 354. FIG. 26 shows the rear rack assembly with the storage container 354 removed. As shown in FIG. 27, rear rack assembly 32 is comprised of a brace 360, a platform 362, a perimeter wall 364, and a passenger seat support 366 which includes a coupler 368.

Figure 28:
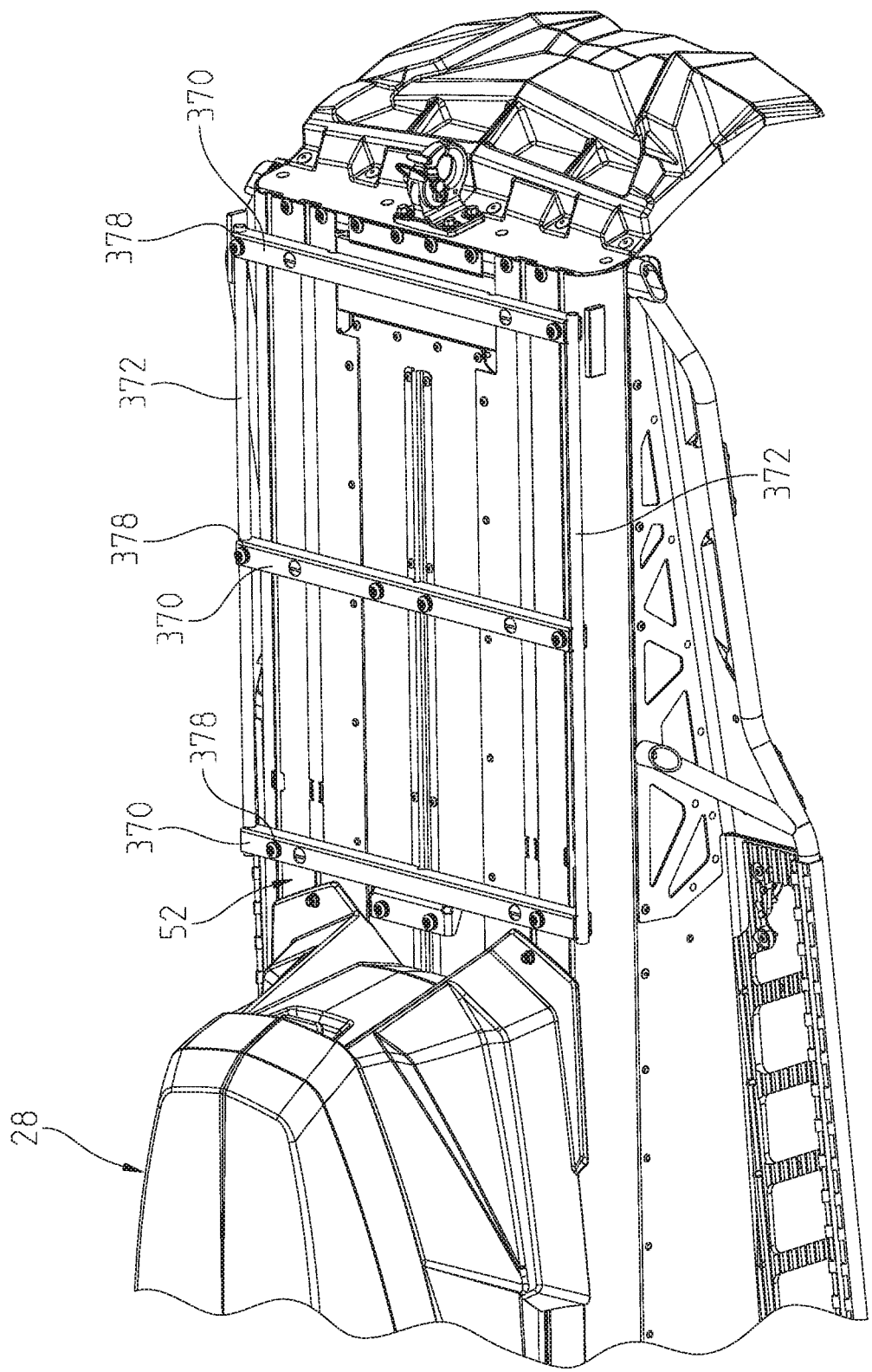
FIG. 28 is a perspective view showing a brace for retaining the rear rack assembly.
Figure 29:
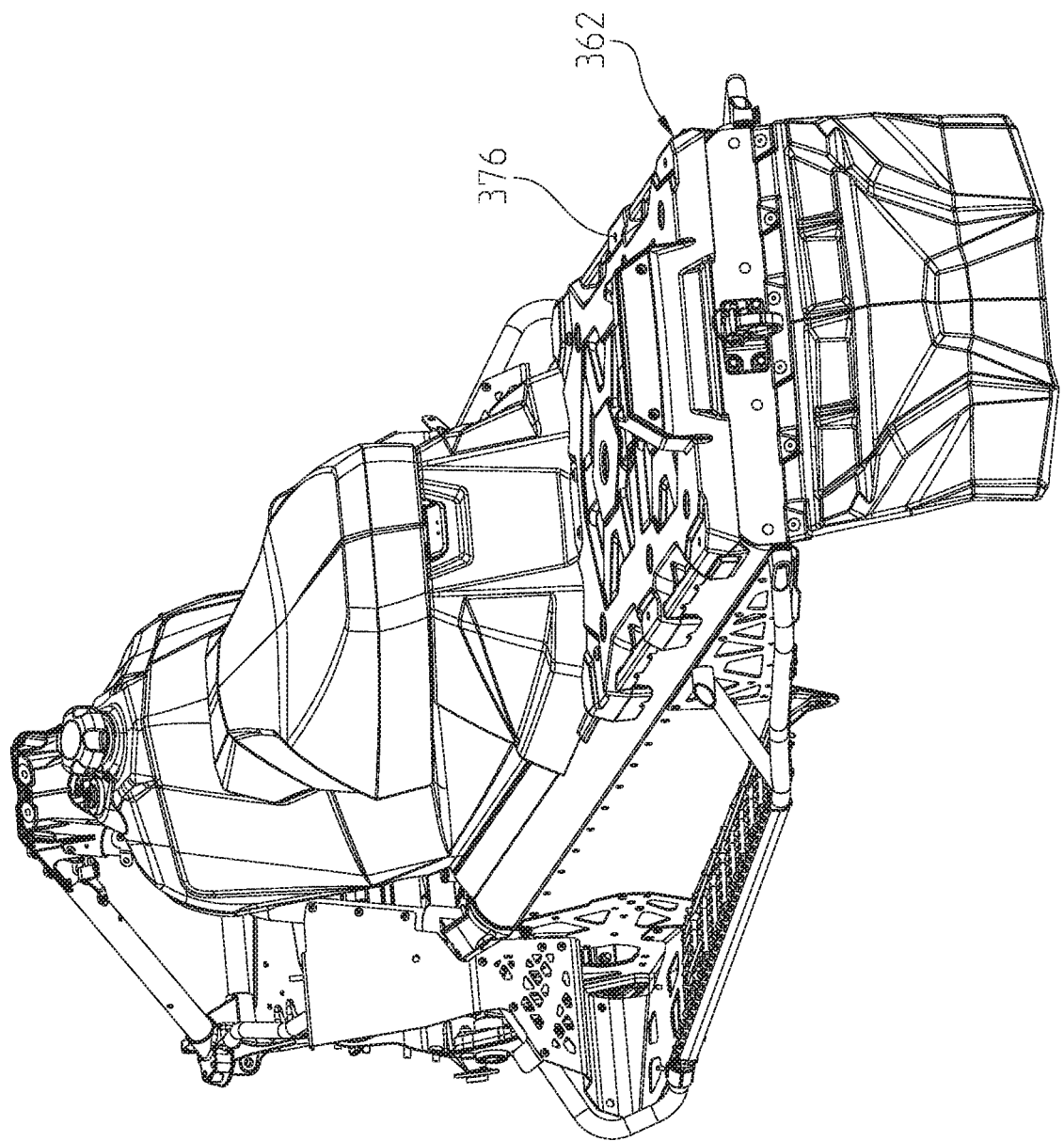
FIG. 29 is a perspective view showing a platform positioned over the brace.

As shown best in FIGS. 27 and 28, brace 360 is shown coupled to the top of the tunnel 52 where brace 360 includes laterally extending brace members 370 and longitudinally extending brace members 372. FIG. 29 shows the platform positioned on top of brace 360 where apertures 376 align with corresponding apertures 378 on brace 360 (FIG. 28). Perimeter wall 364 is shown positioned on top of platform 362 in FIG. 3, where wall 364 includes apertures at 390 which align with apertures 376 and 378. Thus, the platform alone or the platform and wall 364 can be coupled directly to brace 360 by way of aligning the various apertures 376, 378 and 390 and positioning a fastener therethrough to couple to brace 360.

Figure 30:
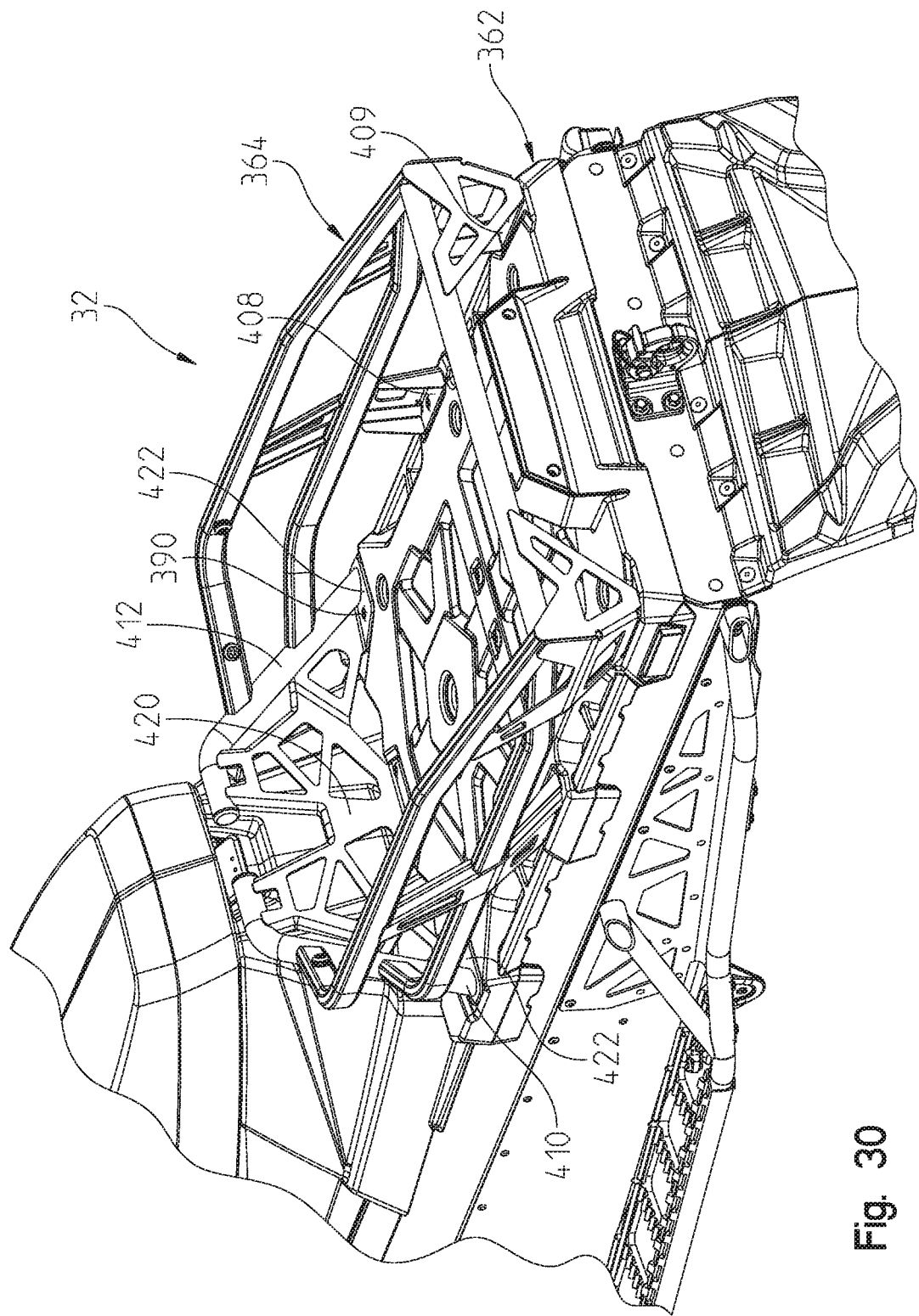
FIG. 30 is a perspective view showing a perimeter wall positioned over the platform.
Figure 31:
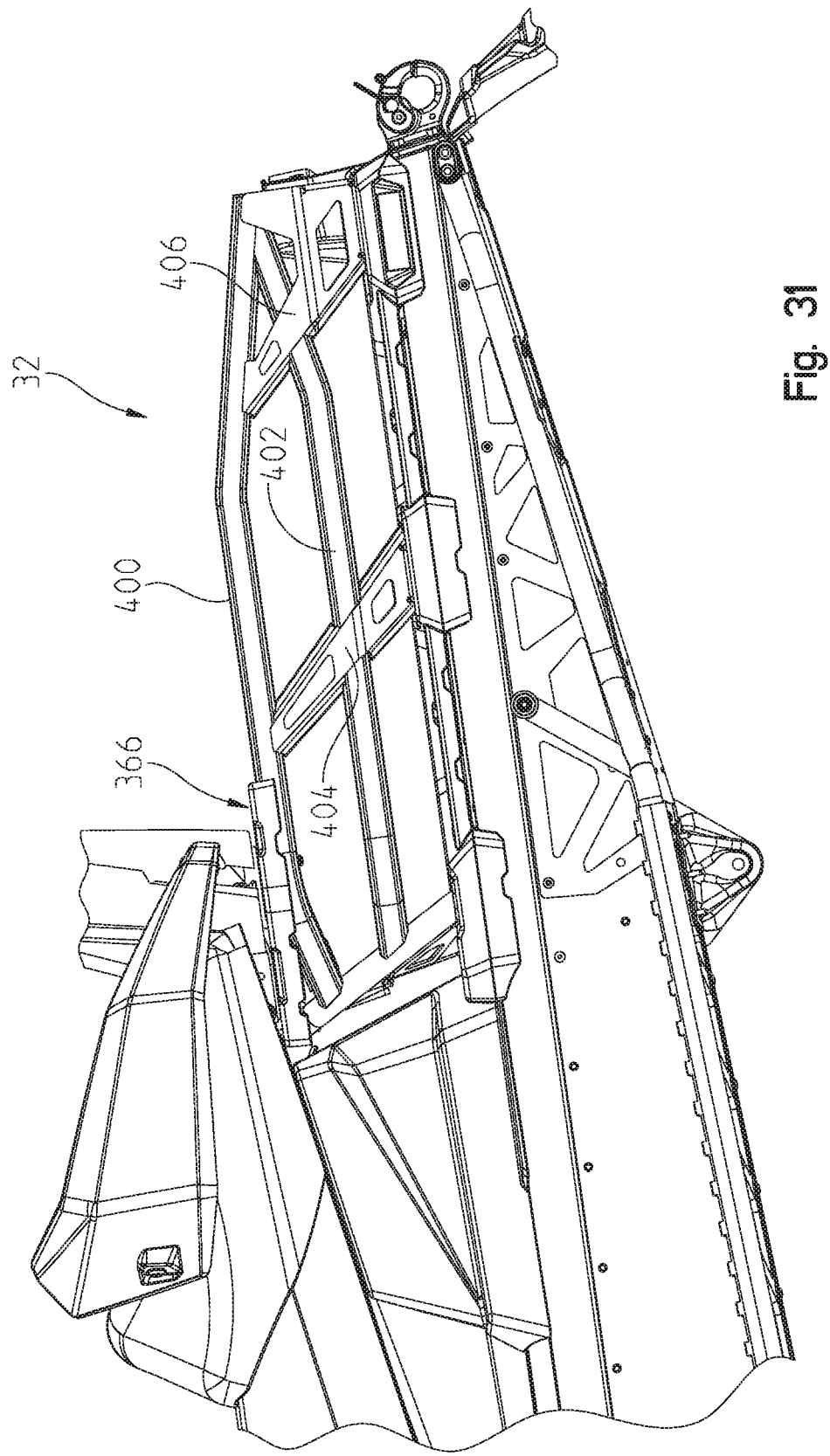
FIG. 31 is side view showing the perimeter wall positioned over the platform.
Figure 32:
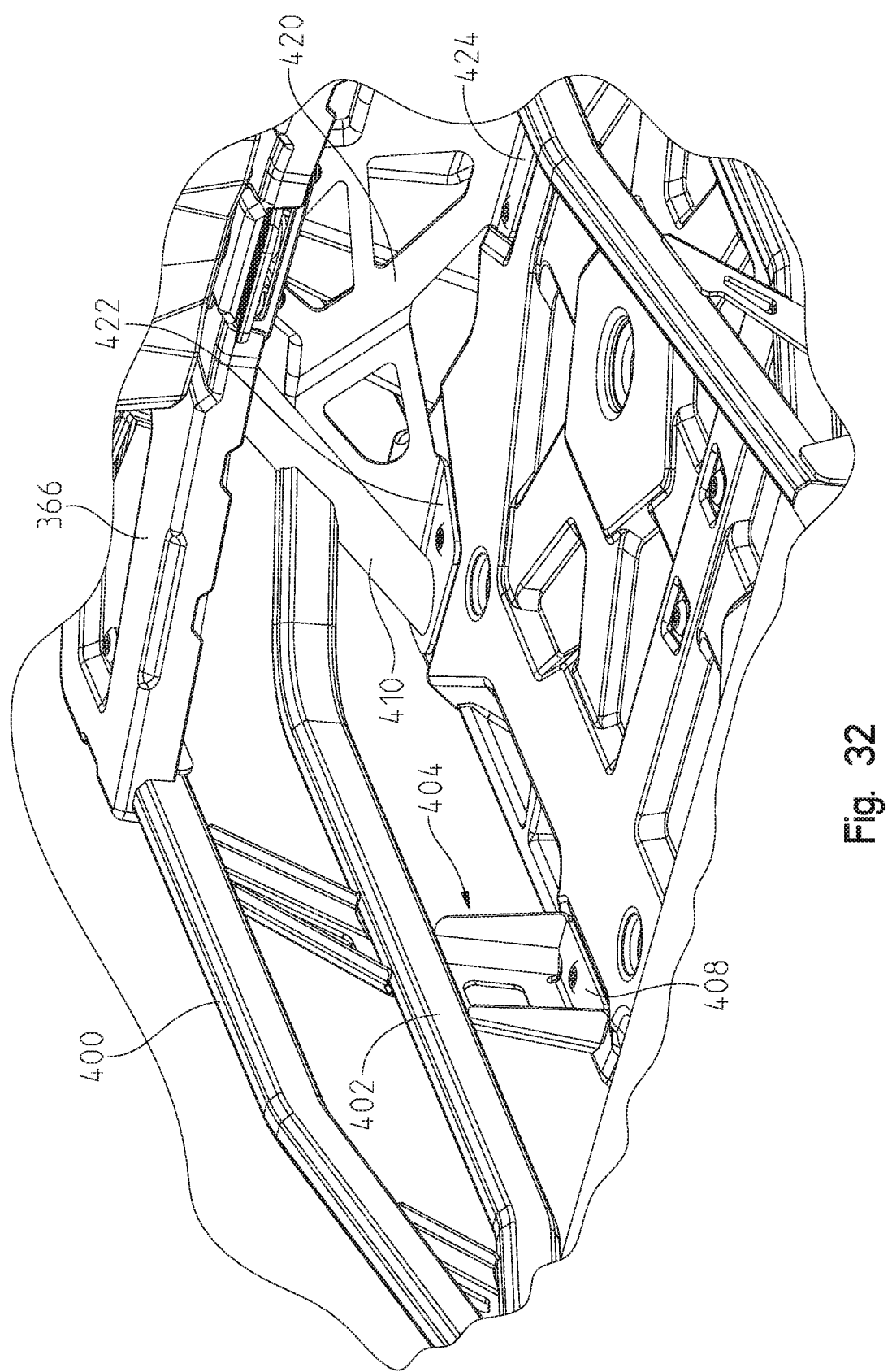
FIG. 32 is a forwardly looking perspective view into the rear rack assembly.
Figure 33:
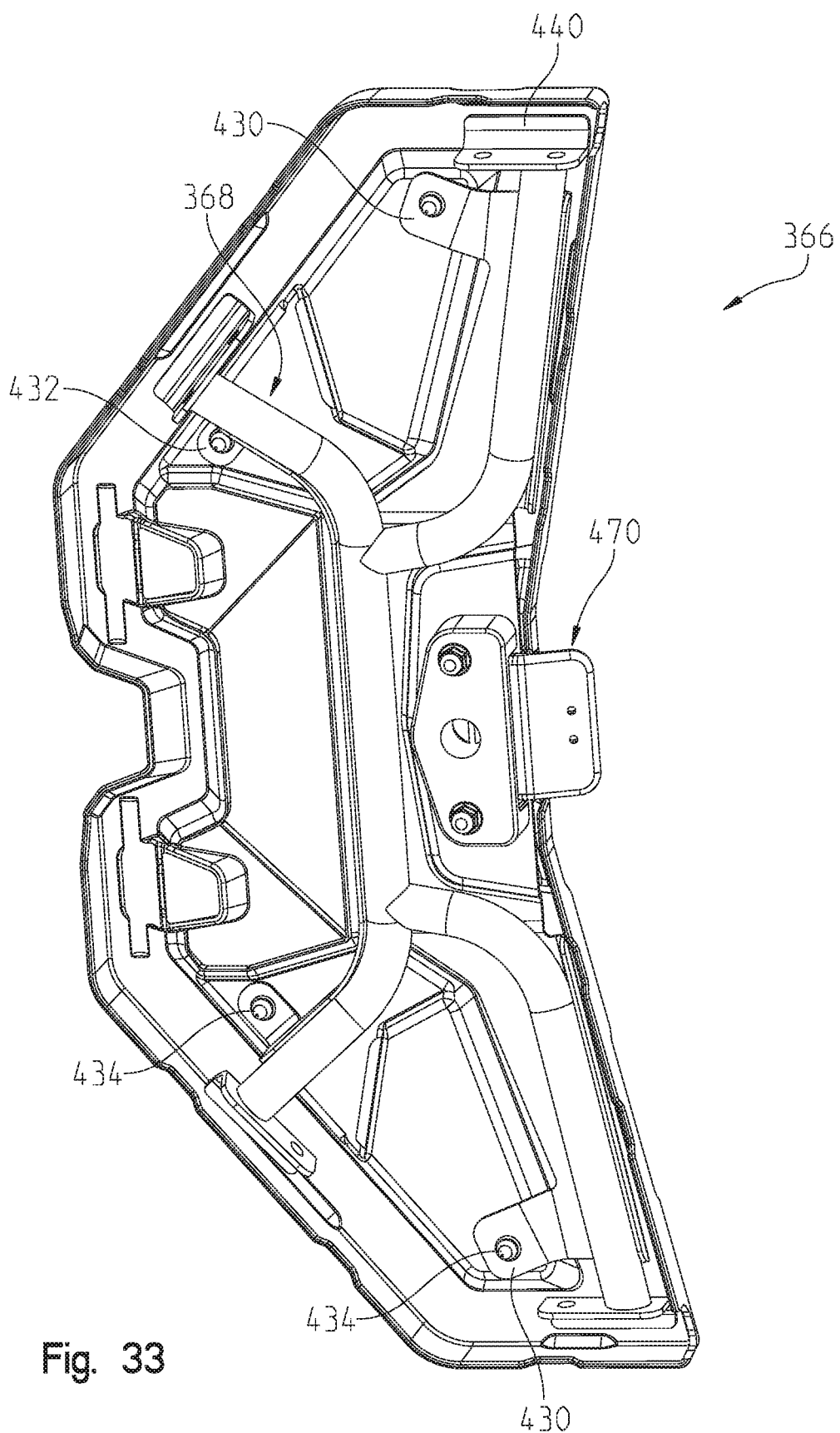
FIG. 33 is an underside perspective view of a a seat support.
Figure 34A:
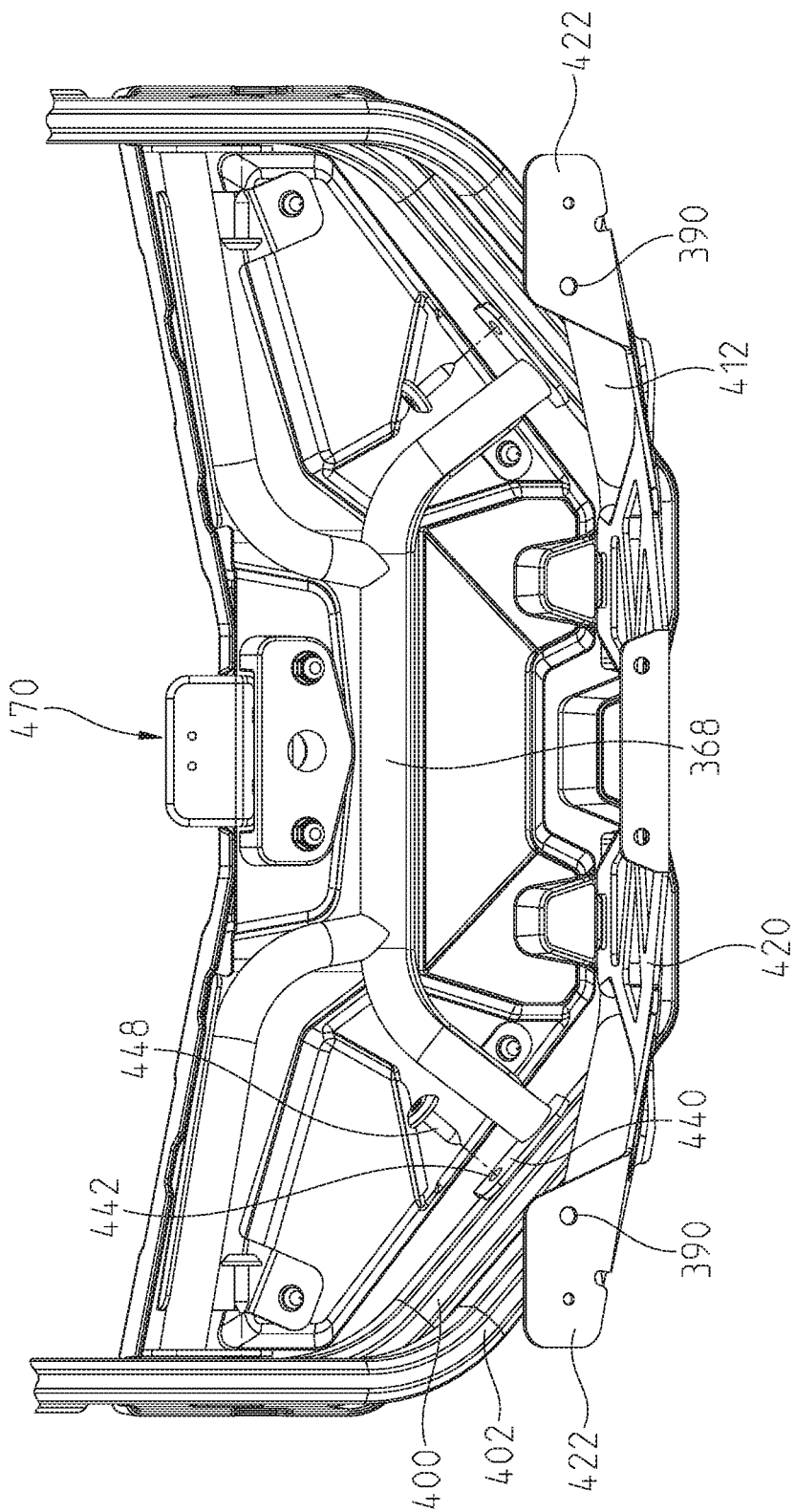
FIG. 34A is an underside perspective view of a seat support.
Figure 34B:
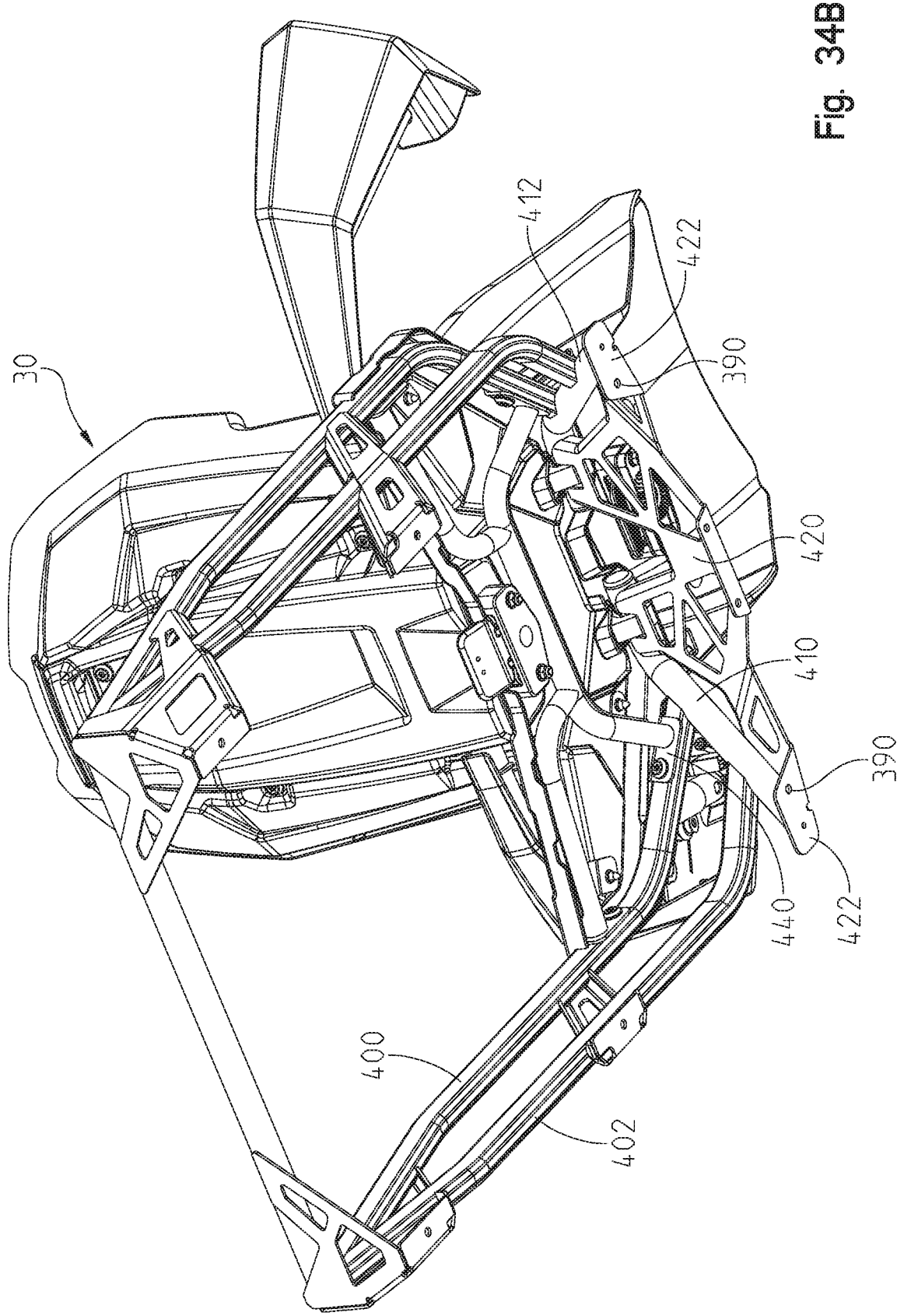
FIG. 34B is an underside perspective view of a passenger seat coupled to the seat support of FIG. 33.
Figure 36:
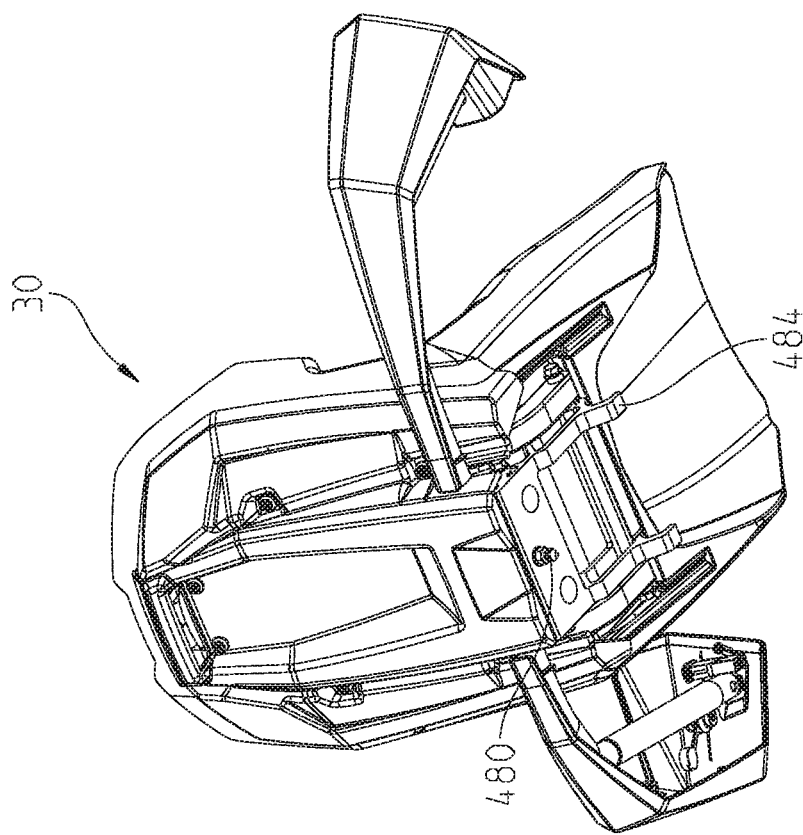
FIG. 36 is an underside perspective view of the passenger seat.

As shown best in FIGS. 30-32, rear rack assembly includes upper rails 400 and lower rails 402, and struts 404 and 406. As shown best in FIG. 30, struts 404 and 406 include mounting tabs 408, 409 for mounting of the perimeter wall. Wall 364 includes supports 410 and 412. A support wall 420 is coupled between the supports 410, 412 and includes mounting tabs 422, 424. As shown best in FIGS. 33 and 34A, seat support 366 includes the coupler 368 mounted to it. Namely, coupler 368 includes mounting tabs 430, 432 which couple to a bottom of seat support 366 by way of fasteners 434. Coupler also includes L-shaped brackets 440 (see FIGS. 33 and 34A) having apertures 442. Thus, seat support 366 and coupler 368 can be attached to upper rail 400 by way of fasteners 448 positioned through apertures 442 and into upper rail 400.

Figure 38:
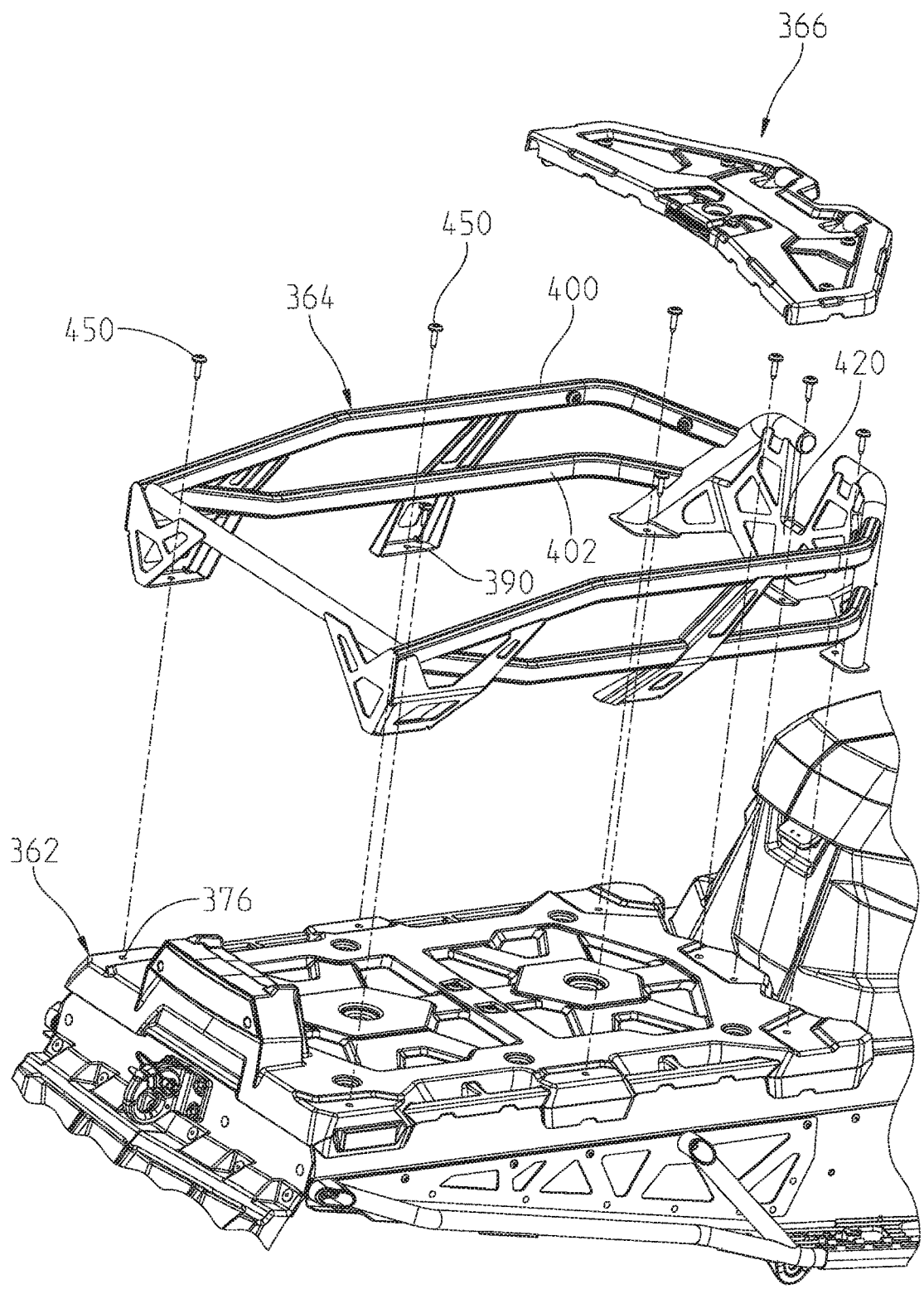
FIG. 38 is an exploded view showing the premier wall and seat support.

With reference now to FIGS. 34B-38, the use of the rear rack assembly 32 will be described in greater detail. As mentioned above, the rear rack assembly 32 can be used with just the platform 362; with the platform 362 and peripheral wall 364; or with the combination of the platform 362, peripheral wall 364 and seat support 366. Thus FIG. 38 shows fasteners 450 which can be used to retain the platform 362 or platform and peripheral wall 364 to the brace 360 (FIG. 27). When the use of the seat support and additional passenger seat 30 is desired, the seat support 366 is attached as described above.

Figure 35:
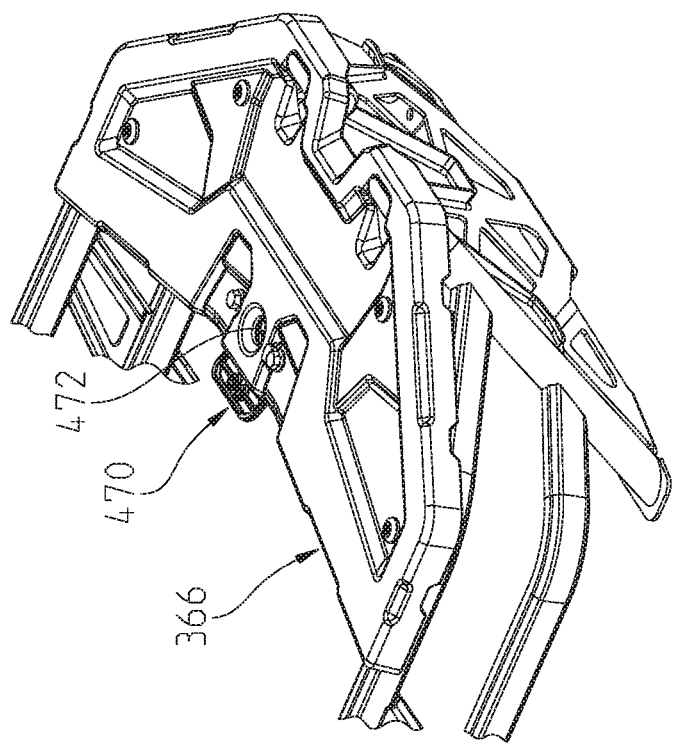
FIG. 35 is a top perspective view showing the seat support.
Figure 37:
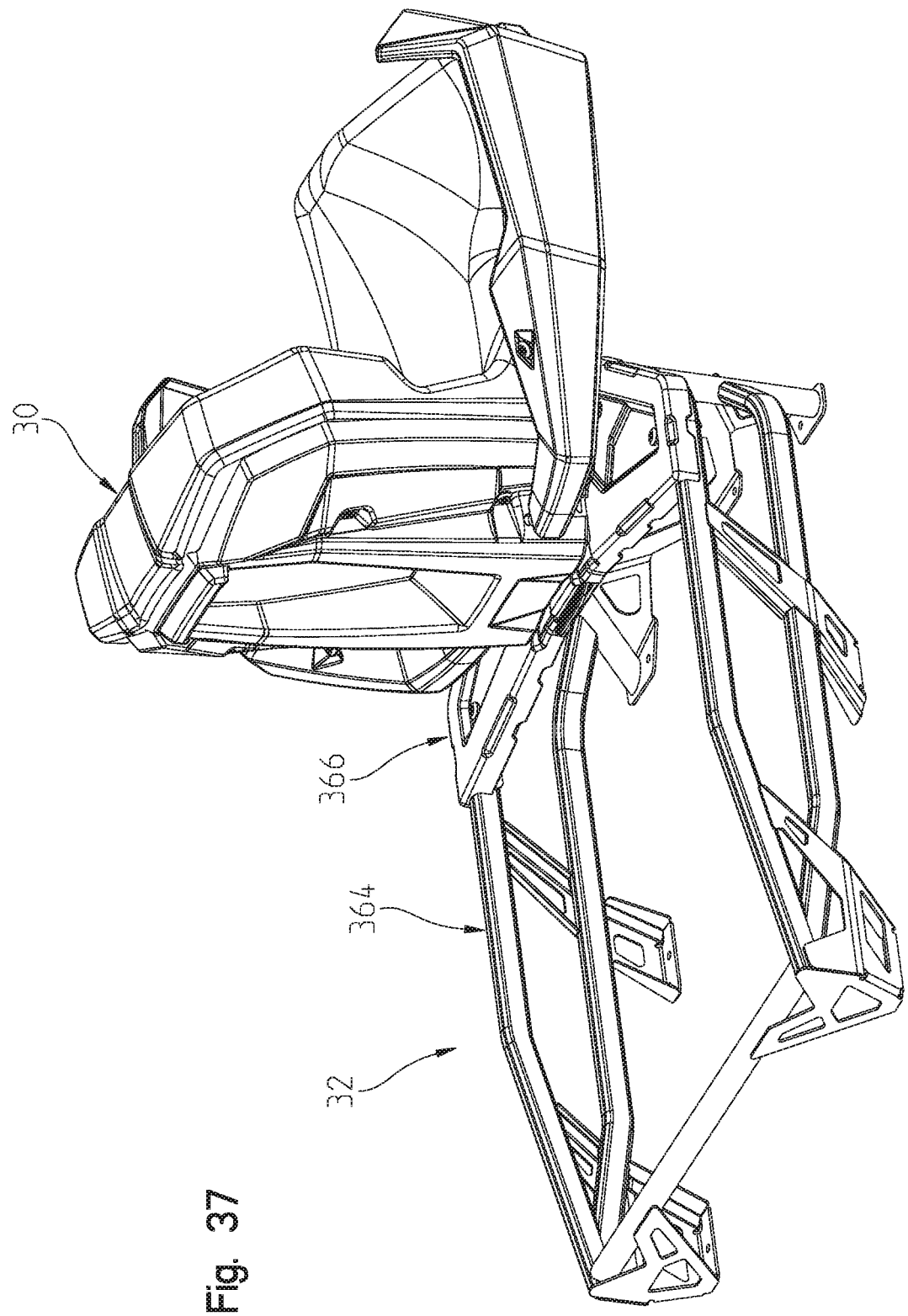
FIG. 37 is a rear perspective view of the seat coupled to the seat support.

As shown best in FIG. 35, the seat support 366 includes a seat latch assembly 470, having a latch opening at 472. As shown best in FIG. 36, the bottom of passenger seat 30 has a latch pin 480, which is received in the opening 472 (FIG. 35) to retain the seat in position. Passenger seat 30 also includes catches 484 which open forwardly and attach to a portion of the frame. The latch 470 and latch pin 480 are more fully described in U.S. Pat. No. 8,678,464, the subject matter of which is incorporated herein by reference.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

What is claimed is:

1. A snowmobile comprising:
   a chassis having a front bulkhead and a tunnel;
   the tunnel having a center section and side walls, and the center section defines an upper surface of the tunnel;
   a structural member positioned at an end of the tunnel sidewall and between the side walls; and
   a tubular strengthening member coupled to the tunnel sidewall and to the structural member, wherein at least one of the structural member and the tubular strengthening member are positioned below the center section.

2. The snowmobile of claim 1, further comprising a side panel positioned over the tunnel sidewall.

3. The snowmobile of claim 2, further comprising a close-off positioned transversely of the tunnel sidewalls, wherein the structural member, the tubular strengthening member and the side panel are all coupled to the close-off.

4. The snowmobile of claim 1, wherein the structural member is positioned within the tunnel.

5. The snowmobile of claim 1, wherein the tubular strengthening member is positioned laterally outward of the side walls.

6. A snowmobile comprising:
   a frame including side walls, a support platform, and a rear cross-member, the side walls cooperating with the support platform to define a tunnel;
   an endless belt assembly supported by the frame;
   a seat coupled to the support platform; and a towing member located rearward of the seat and coupled to the rear cross-member through at least one fastening member, the towing member extending outward from the rear cross-member and the towing member comprising a cavity configured to interface with a towing attachment member.

7. The snowmobile of claim 6, further comprising a snow flap coupled to the rear cross-member and extending downward from the rear cross-member.

8. The snowmobile of claim 7, wherein the snow flap is coupled to the rear cross-member adjacent the towing member.

9. The snowmobile of claim 7, wherein the towing member extends over a portion of the snow flap.

10. The snowmobile of claim 6, further comprising a heat exchanger extending downwardly from the support platform, wherein the rear cross-member is coupled to a surface of the heat exchanger.

11. The snowmobile of claim 6, wherein the at least one fastening member is a screw or a bolt that passes through the rear cross-member.

12. The snowmobile of claim 6, further comprising a cargo frame coupled to the rear cross-member and positioned rearward of the seat.

13. The snowmobile of claim 12, wherein the cargo frame is positioned above the support platform and is coupled to at least one of the support platform and the side walls at a plurality of locations.

14. The snowmobile of claim 12, wherein the cargo frame is coupled to the rear cross-member through at least one connecting member positioned above the towing member and between the cargo frame and rear cross-member.

15. A snowmobile comprising:

a chassis having a front bulkhead and a tunnel;

the tunnel having a center section and side walls;

a side panel positioned over the tunnel sidewall;

a structural member positioned at an end of the tunnel sidewall and between the side walls;

a tubular strengthening member coupled to the tunnel sidewall and to the structural member; and a close-off positioned transversely of the tunnel sidewalls, wherein the structural member, the tubular strengthening member and the side panel are all coupled to the close-off.

* * * * *